(12) United States Patent
Koseki

(10) Patent No.: US 7,343,544 B2
(45) Date of Patent: Mar. 11, 2008

(54) OPTICAL DISK PLAYBACK APPARATUS AND DATA PLAYBACK METHOD THEREFOR

(75) Inventor: Youichi Koseki, Yamagata (JP)

(73) Assignee: NEC Electronics Corporation, Kanagawa (JP)

( * ) Notice: Subject to any disclaimer, the term of this patent is extended or adjusted under 35 U.S.C. 154(b) by 1004 days.

(21) Appl. No.: 10/626,518

(22) Filed: Jul. 25, 2003

(65) Prior Publication Data

US 2004/0125719 A1 Jul. 1, 2004

(30) Foreign Application Priority Data

Jul. 25, 2002 (JP) .............................. 2002-216308

(51) Int. Cl.
*G11C 29/00* (2006.01)
(52) U.S. Cl. ........................ 714/769; 455/59; 455/63.1; 455/66.1
(58) Field of Classification Search ............... 455/63.1, 455/59, 66.1
See application file for complete search history.

(56) References Cited

U.S. PATENT DOCUMENTS

| | | | | |
|---|---|---|---|---|
| 5,218,450 | A * | 6/1993 | Nagai et al. .................. 386/70 |
| 5,420,839 | A * | 5/1995 | Tateishi .................. 369/30.25 |
| 5,493,414 | A * | 2/1996 | Inoue et al. .................. 386/52 |
| 5,896,364 | A * | 4/1999 | Okazaki et al. .......... 369/275.3 |
| 5,917,782 | A * | 6/1999 | Kim et al. .............. 369/30.23 |
| 5,931,921 | A * | 8/1999 | Kyle ........................... 710/29 |
| 6,058,453 | A * | 5/2000 | Packer ....................... 711/112 |
| 6,119,201 | A * | 9/2000 | Kulakowski et al. ....... 711/112 |
| 6,519,216 | B1 * | 2/2003 | Suenaga et al. ......... 369/47.18 |
| 6,538,961 | B2 * | 3/2003 | Kobayashi et al. ........... 369/14 |
| 6,862,258 | B2 * | 3/2005 | Kitagawa ................... 369/53.3 |
| 7,023,781 | B2 * | 4/2006 | Tsuji ....................... 369/53.31 |
| 2003/0165096 | A1* | 9/2003 | Mashiko .................. 369/47.28 |
| 2005/0281160 | A1* | 12/2005 | Pan et al. ................ 369/47.31 |

FOREIGN PATENT DOCUMENTS

| | | |
|---|---|---|
| JP | 60-136061 A | 7/1985 |
| JP | 5-282785 A | 10/1993 |
| JP | 6-96529 A | 4/1994 |
| JP | 9-17124 A | 1/1997 |
| JP | 9-73718 A | 3/1997 |
| JP | 10-40645 A | 2/1998 |
| JP | 2000-105978 A | 4/2000 |
| JP | 2000-152187 A | 5/2000 |
| JP | 2001-291330 A | 10/2001 |

* cited by examiner

*Primary Examiner*—Jacques Louis-Jacques
*Assistant Examiner*—Sam Rizk
(74) *Attorney, Agent, or Firm*—Sughrue Mion, PLLC

(57) ABSTRACT

An optical disk playback apparatus for playing back or reproducing main data and its associated sub-code which are read from an optical recording medium comprises an interleave RAM for storing the main data. The optical disk playback apparatus performs a predefined synchronization protection on synchronization information included in the sub-code to generate a sub-code synchronization signal which is written into an empty area of the interleave RAM, and manages the addresses with a FIFO area in a manner similar to the main data, thereby causing the read sub-code synchronization signal to function in synchronization with the main data.

26 Claims, 14 Drawing Sheets

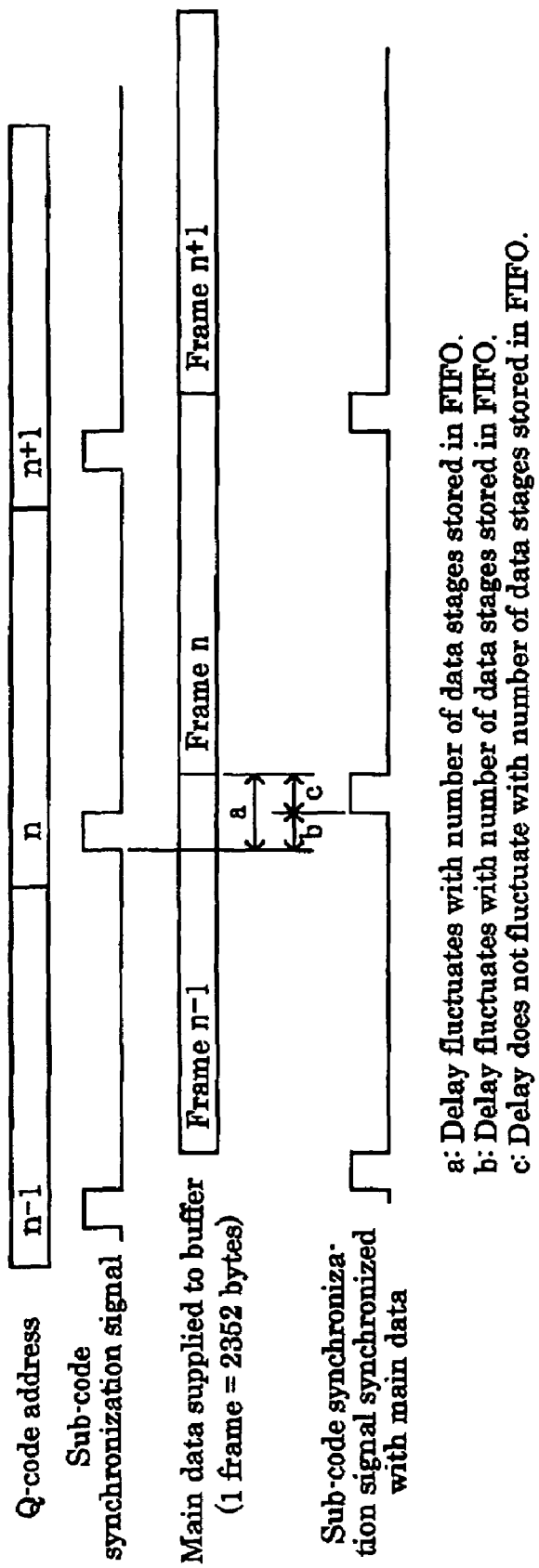

Data comparison method:

Address comparison method:

Data-timing prediction method:

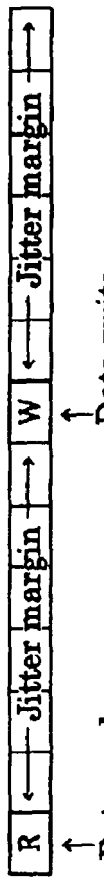

FIG. 11A R and W positions immediately after resetting (centered position)

FIG. 11B R and W positions immediately before overflow

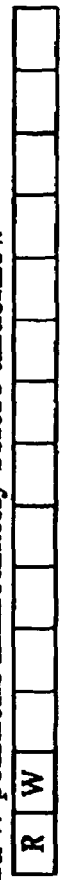

FIG. 11C R and W positions immediately before underflow

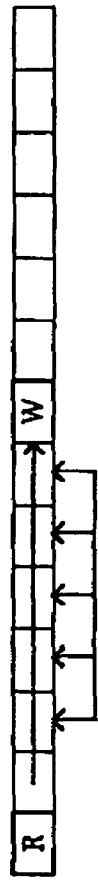

FIG. 11D When R=W, underflow occurs to immediately trigger centering of addresses. At address where R=W, no write is performed.

Write data 0H

* Data at address to right of W before jump is obsolete (indefinite) data of adjacent symbol. To prevent reading out erroneous data at R, data 0H is written into address which is jumped.

FIG. 11E In case of overflow, no indefinite data is read out at R.

28th: Symbol 0D
R and W positions
immediately before underflow

Centering upon underflow

Centering upon underflow

OPTICAL DISK PLAYBACK APPARATUS AND DATA PLAYBACK METHOD THEREFOR

BACKGROUND OF THE INVENTION

1. Field of the Invention

The present invention relates to an optical disk playback apparatus and a data playback method therefor, and more particularly to an improved optical disk playback apparatus and data playback method therefor which ensure continuity of data on a buffer memory even if the apparatus once stops and resumes a sequence of operations for reading data from an audio CD (Compact Disk), decoding the read data, and storing the decoded data in the buffer memory.

2. Description of the Related Art

The CD is known as a representative optical recording medium for recording music data and the like. FIG. 1 shows a data format on the CD.

The data structure within a CD comprises a frame synchronization area, a sub-code area, and a data and parity area, wherein a minimum block of the data structure is referred to as a frame, and one basic block is formed of 98 frames. Each frame is comprised of a 24-bit frame synchronization signal and a 14-bit sub-code synchronization signal which serve as time information, and 32 symbols which include an upper set and a lower set. The upper set includes 12 upper data symbols and 4 parity symbols for C2 error code correction, and the set includes 12 lower data symbols and 4 parity symbols for C2 error code correction.

Frame 1 has a frame synchronization signal set therein which is comprised of "100000000000010000000000010" of a 24-bit length. A sub-code area comprises a sub-code synchronization signal S0 in frame 1, and a sub-code synchronization signal S1 in frame 2. Sub-code synchronization signal S0 is set to be "01000000000000" of a 14-bit length, while sub-code synchronization signal S1 is set to be "00000000010010" of a 14-bit length. The sub-code area in each of frame 3 to frame 29 has a length of 8 bits which are comprised of P, Q, R, S, T, U, V, W bits. Therefore, the sub-code area in frame 3 is comprised of data P1, Q1, R1, S1, T1, U1, V1, W1, and the same rule applies correspondingly to the following, so that the sub-code area in frame 98 is comprised of data P96, Q96, R96, S96, T96, U96, V96, W96.

In each frame, 1-bit data P corresponds to a music locate function, and 1-bit data Q corresponds to a program function for playing music in a preset order. The six bits R to W are used to set data for display and other purposes.

Assuming a string of data Q retrieved from respective frames 1 to 98, data Q in frame 1 comprises sub-code synchronization signal S0, and data Q in frame 2 comprises sub-code synchronization signal S1. Then, four bits Q1 to Q4 are set as an area for controlling; four bits Q5 to Q8 as an area for addressing; 72 bits Q9 to Q80 as a data area; and 16 bits Q81 to Q96 as a CRC (Cyclic Redundancy Check) area.

Further, 72 bits Q9 to Q80 is comprised of eight bits from Q9 which represent a "track number"; the next eight bits which represent an "index"; the next 24 bits which define an area indicative of a relative time from the head of the disk, which is broken down into the first eight bits representative of "minutes," the next eight bits representative of "seconds," and the next eight bits representative of the "number of frames"; the next eight bits which are all set at "0"; and the next 24 bits which define an area indicative of an absolute time from the head of the disk, which is broken down into the first eight bits representative of "minutes," the next eight bits representative of "seconds," and the next eight bits representative of "frame," where particular data are set in the respective bits.

The foregoing 32 symbols are interleaved, wherein four bytes of parity bits are added to 24 contiguous bytes of data, and the resulting data am rearranged such that they are distributed over a plurality of frames.

Another four bytes of parity bits are added to each frame comprised of 28 bytes of the interleaved data to complete the aforementioned 32-byte frame of data which is recorded on a CD in accordance with EFM (Eight-to-Fourteen Modulation).

Specifically, for recording on the CD, a C2 code is added to original data for error correction, and the resulting data is distributed over a plurality of frames, each of which is subsequently provided with a C1 code for error correction. For playing back the thus recorded CD, the C1 code is first used to detect and correct errors, in the order reverse to the above. Then, after the error correction using the C1 code, the data is arranged back in the original order, and data in erroneous frames, which could not be corrected by the C1 code, are distributed and corrected for errors by the C2 code. The C1 code is capable of correcting two bytes of errors within 28 bytes, whereas the C2 code is capable of correcting four bytes of errors within 28 bytes.

In the CD having the foregoing recording/playing system, data is read from the disk faster than actually played music, the data read from the disk is decoded, and the resulting decoded data is once stored in a buffer memory.

The data once stored in the buffer memory is subsequently read from the buffer memory for playing music based on the read data. When an audio CD used in such a music play system does not include the synchronization data in decoded data, it is necessary to ensure continuity of the data on the buffer memory for once stopping an operation of storing the decoded data read from the disk in the buffer memory and later resuming the operation.

Otherwise, when particular data on the buffer memory is updated, and decoded data subsequent thereto is continuously stored in the buffer memory, it is necessary to ensure correct restoration of the updated data on the buffer memory.

For playing music recorded on a CD, data stored in the buffer memory is sequentially read therefrom, wherein no recognition is made as to temporary stop of a data write into the buffer and an update of data on the buffer memory which should have been performed by the time the data is read from the buffer memory.

For acquiring data for storage in the buffer memory from data read from a disk, the data read from the disk must undergo EFM frame synchronization, EFM demodulation, and the aforementioned CIRC (Cross Interleaved Reed-Solomon Code) decoding.

For recording data on a CD, a predefined conversion table is utilized to convert 8-bit values to 14-bit values for recording, that is, EFM modulation. In other words, 14-bit data recorded on a CD has a content of 8-bit data. Therefore, for playing back data from a CD, EFM demodulation is required for converting the modulated 14-bit data to 8-bit data.

The aforementioned EFM frame synchronization entails detecting a 24-bit EFM SYNC pattern "100000000001000000000010" to determine the head of a 588-bit EFM frame, and separating one sub-code symbol and 32 main data symbols from the 588-bit EFM frame, where one symbol is comprised of 14 bits.

The sub-code synchronization in turn entails determining the head of a sub-code frame in each of 98 EFM frames from sub-code SYNC patterns S0, S1, and performing the EFM demodulation to produce 96-byte sub-code data per sub-code frame, when including even data separations.

The CIRC decoding based on sub-code symbols P to Q generally employs an interleave RAM (Random Access Memory) which have 2,048 address s, each of which provides an 8-bit data width. In response to a bit dock generated by a PLL (Phase Locked Loop) from a signal read from the disk, data read from the disk is captured, which involves the EFM frame synchronization, EFM demodulation, separation of sub-codes, and storage of main data into the interleave RAM.

The operations associated with the capture of sub-code data and writing of main data into the interleave RAM do not rely on the bit clock but on a clock from a quartz oscillator in response to an event signal generated from the bit clock.

On the other hand, the clock from the quartz oscillator is relied on for the CIRC decoding, writing of decoded data into the buffer memory, reading of data from the buffer memory, and a music play.

If a bit clock fluctuates due to uneven rotations of a disk during a play of music from the CD, the data rate also fluctuates when data read from the disk is stored in the interleave RAM, resulting in a difference in data rate between the CIRC decoding performed at a fixed rate based on the clock from the quartz oscillator and a read of decoded data. For this reason, the interleave RAM is provided with an FIFO (First-In First-Out) area as jitter margin for absorbing a difference in data rate, if any, due to the bit clock operation.

The FIFO operation is provided for the interleave RAM with the intention of correctly reading data at a data rate upon reading even if the data rate fluctuates during a write. Since a certain address area is set for use as a jitter margin between write addresses and read addresses, data is read from addresses spaced from write addresses by at least the jitter margin area.

Specifically, referring to FIG. 2 for describing a conventional disk playback method, in a system which has a FIFO area as the jitter margin in an interleave RAM, a delay between a storage of data read from a disk into the interleave RAM and a read of decoded data after the CIRC decoding fluctuates during the FIFO operation.

On the other hand, since the FIFO operation is not applied to the sub-code data separated in the EFM demodulation, unlike main data, time/position information, which is Q-code data included in the sub-code data, as well as decoded data include phase fluctuations due to the FIFO operation.

In a system configured to store decoded data in a buffer memory, when a storage of decoded data is once stopped and resumed, or when particular data on the buffer memory is updated by decoded data and subsequent decoded data is stored in sequence, a data read position on the disk is moved to a target position based on the time/position information provided by the Q-code, such that decoded data is stored in the buffer memory from a predetermined location. However, since decoded data from an audio CD is nothing but audio data and does not include the synchronization signal, no determination can be made from the decoded data itself on the position of decoded data from which the data is fetched into the buffer memory.

In addition, when the phase relative to the sub-code synchronization signal is relied on to determine the position of decoded data from which data is fetched into the buffer memory, the ability for playback cannot be ensured because of fluctuations in phase due to the FIFO operation.

Referring now to FIGS. 3A to 3C provided for describing another example of conventional disk playback method, FIG. 3A illustrates one method which is typically employed in the art. As described in JP-P2000-105978A, this method involves comparing decoded data with data on a buffer memory to determine predetermined decoded data. Alternatively, a method employed therein cancels fluctuations in phase due to the FIFO operation. The ability for playing back data is ensured by establishing the synchronization of sub-code information, which is a synchronization signal and time/position information, with the decoded data, and storing these data in the buffer memory.

As illustrated in FIG. 3B, another method involves comparing a write address at which data read from a particular location on a disk, on a frame in target time/position information, is stored in an interleave RAM, with a read address of the interleave RAM from which decoded data is retrieved, and generating a timing signal when a match is found between both addresses.

As illustrated in FIG. 3C, a further method involves generating a timing signal indicative of a timing at which target decoded data is delivered from the number of FIFO stages and throughput in the CIRC decoding.

JP-60-136061-A discloses a method of providing sub-code data synchronized with main data by storing sub-code symbols as well in an interleave RAM and managing the addresses of the sub-code symbols in a similar manner to the main data.

Each of the foregoing examples shows an exemplary system which has a FIFO area in an interleave RAM for absorbing jitter. In a method disclosed in JP-9-17124-A, a bit clock is generated by a PLL from a signal read from a disk, and data read from the disk is fetched in response to the bit clock, specifically, through EFM frame synchronization, EFM demodulation, separation of sub-codes, and storage of main data into an interleave RAM, followed by CIRC decoding and writing of decoded data into a buffer memory. A clock from a quartz oscillator is relied on to read data from the buffer memory and play music.

As described above, in one of the conventional disk playback apparatuses which employs a method that involves comparing decoded data with data on the buffer memory to determine predetermined decoded data, a larger amount of hardware is required as a larger amount of data are to be compared. This apparatus also implies a problem of failing to eliminate the possibility of erroneous determination even if a larger amount of data is compared.

In the apparatus which employs a method that involves comparing a write address at which data read from a disk is stored in an interleave RAM, with a read address of the interleave RAM from which decoded data is retrieved, the comparison of the write address with the read address in the interleave RAM requires holding and comparison of 11-bit data, giving rise to a problem that a large amount of hardware is needed.

The method which involves generating a timing signal indicative of a timing at which target decoded data is delivered from the number of FIFO stages and throughput in the CIRC decoding has a problem of an increased number of bits required in a counter which is used to measure a large delay value.

In the method of providing sub-code data synchronized with main data by storing sub-code symbols as well in an interleave RAM and managing the addresses of the sub-code symbols in a similar manner to the main data, even if 8-bit sub-code symbols can be stored in the interleave RAM of 8-bit data width, the sub-code synchronization signals S0, S1 cannot be represented in bits, giving rise to a problem of losing the sub-code synchronization signals S0, S1 upon storage of symbols in the interleave RAM.

Fluctuations in data rate, at which data is fetched, due to uneven rotations of the disk are absorbed in a buffer memory which stores decoded data, so that the decoded data and sub-code data are free from fluctuations in phase. A drawback of such a system is an increased burden which is charged on a microprocessor and software due to requirements for monitoring and controlling data stored in the buffer memory, because the data rate, at which decoded data is stored in the buffer memory, is not fixed but is fluctuated due to uneven rotations of the disk and the like, as compared with a system which handles decoded data at a fixed rate.

Also, a buffer memory for storing decoded data is essential in such a system for playing music, so that the system cannot adopt a simplified strategy of playing music from decoded data without intervention of the buffer memory.

SUMMARY OF THE INVENTION

It is an object of the present invention to provide a technique of ensuring continuity of data on a buffer memory even if a sequence of operations is once stopped and resumed in reading data from an audio CD (Compact Disk), decoding the read data, and storing the decoded data in the buffer memory.

According to a first aspect of the present invention, there is provided an optical disk playback apparatus for playing back or reproducing main data and an sub-code which is associated with the main data. The main data and the sub-code are read out from an optical recording medium. The apparatus includes an interleave RAM (Random Access Memory) for storing the main data, and interleave RAM control means for writing a sub-code synchronization signal generated by performing a predefined synchronization protection on synchronization information included in the sub-code into an empty area of the interleave RAM to manage the addresses with a FIFO (First-In First-Out) area in a manner similar to the main data, causing the read sub-code synchronization signal to function in synchronization with the main data.

According to a second aspect of the present invention, there is provided an optical disk playback apparatus for playing back or reproducing main data and the sub-code which is associated with the main data. The main data and the sub-code are read out from an optical recording medium. The apparatus includes an interleave RAM for storing the main data, and interleave RAM control means for writing a sub-code synchronization signal generated by performing a predefined synchronization protection on synchronization information included in the sub-code into an empty area of the interleave RAM to manage the addresses with a FIFO area in a manner similar to the main data, causing the sub-code synchronization signal read from the interleave RAM to function as a sub-code synchronization signal synchronized with the main data. The interleave RAM control means includes means for writing, when the FIFO area included in the interleave RAM is centered in response to an underflow of the FIFO area, "0" data into addresses of a sub-code synchronization signal storage area jumped by the centering.

According to a third aspect of the present invention, there is provided an optical disk playback apparatus for playing back or reproducing main data and the sub-code which is associated with the main data. The main data and the sub-code are read out from an optical recording medium. The apparatus includes an interleave RAM for storing the main data, interleave RAM control means for writing a sub-code synchronization signal generated by performing a predefined synchronization protection on synchronization information included in the sub-code into an empty area of the interleave RAM to manage the addresses with a FIFO area in a manner similar to the main data, causing the sub-code synchronization signal read from the interleave RAM to function as a sub-code synchronization signal synchronized with the main data, and synchronization signal masking means for masking the sub-code synchronization signal read from the interleave RAM for a certain period from an underflow of the FIFO area to a read of addresses of a sub-code synchronization signal storage area jumped by the centering of the FIFO area.

According to a fourth aspect of the present invention, there is provided an optical disk playback apparatus for playing back or reproducing main data and the sub-code which is associated with the main data. The main data and the sub-code are read out from an optical recording medium. The apparatus includes an interleave RAM for storing the main data, and double synchronization protecting means for storing the main data in the interleave RAM, and also writing a 1-bit sub-code synchronization signal generated by performing a predefined first synchronization protection on synchronization information included in the sub-code into an empty area of the interleave RAM, and performing a second synchronization protection different from the first synchronization protection on the sub-code synchronization signal read from the interleave RAM together with the main data.

According to a fifth aspect of the present invention, there is provided an optical disk playback apparatus for playing back or reproducing main data and the sub-code which is associated with the main data. The main data and the sub-code are read out from an optical recording medium. The apparatus includes a flag RAM for storing flag signals associated with the main data, and flag RAM control means for writing a sub-code synchronization signal generated by performing a predefined synchronization protection on synchronization information included in the sub-code into an empty area of the flag RAM to manage the addresses with a FIFO area in a manner similar to the main data, causing the sub-code synchronization signal read from the flag RAM to function in synchronization with the main data.

According to a sixth aspect of the present invention, there is provided a data playback method in an optical disk playback apparatus for playing back or reproducing main data and the sub-code which is associated with the main data. The main data and the sub-code are read out from an optical recording medium. The method includes the steps of previously performing a predefined synchronization protection on synchronization information included in the sub-code to generate a sub-code synchronization signal, writing the sub-code synchronization signal in an empty area of an interleave RAM for storing the main data, and managing the addresses with a FIFO area in a manner similar to the main data to cause the sub-code synchronization signal read from the interleave RAM to function in synchronization with the main data.

According to a seventh aspect of the present invention, there is provided a data playback method in an optical disk playback apparatus for playing back or reproducing main data and the sub-code which is associated with the main data. The main data and the sub-code are read from an optical recording medium. The method includes the steps of previously performing a predefined synchronization protection on synchronization information included in the subs code to generate a sub-code synchronization signal, writing the sub-code synchronization signal into an empty area of a flag RAM for storing a flag signal of the main data, and managing the addresses with a FIFO area in a manner similar to the main data to cause the sub-code synchronization signal read from the flag RAM to function in synchronization with the main data.

According to an eighth aspect of the present invention, there is provided a data playback method in an optical disk playback apparatus for playing back or reproducing main data and the sub-code which is associated with the main data. The main data and the sub-codes are read out from an optical recording medium. The method includes the steps of previously performing a predefined synchronization protection on synchronization information included in the sub-code to generate a sub-code synchronization signal, writing the sub-code synchronization signal in an empty area of an interleave RAM for storing the main data, managing the addresses with a FIFO area in a manner similar to the main data to cause the sub-code synchronization signal read from the interleave RAM to function as a sub-cod synchronization signal which is synchronized with the main data, centering the FIFO area included in the interleave RAM in response to an underflow of the FIFO area, and writing "0" data into the address of a sub-code synchronization signal storage area which is jumped by the centering.

According to a ninth aspect of the present invention, there is provided a data playback method in an optical disk playback apparatus for playing back or reproducing main data and the sub-code which is associated with the main data. The main data and the sub-code are read from an optical recording medium. The method includes the steps of storing the main data in an interleave RAM, performing a predefined first synchronization protection on synchronization information included in the sub-code to generate a 1-bit sub-code synchronization signal, writing the sub-code synchronization signal into an empty area of the interleave RAM, reading the sub-code synchronization signal from the interleave RAM together with the main data, and performing a second synchronization protection different from the first synchronization protection on the sub-code synchronization signal read from the interleave RAM.

According to one embodiment of the present invention, an optical disk playback apparatus includes a PLL (Phase Locked Loop) circuit for generating a bit clock from main data and an associated sub-code read from an optical recording medium which stores said main data and said sub-code, data detecting and demodulating means for receiving the bit clock, the main data and the sub-code, detecting synchronization information, demodulating EFM (Eight-to-Fourteen Modulation) modulated main data, and delivering the demodulated main data, synchronization protecting/error correcting/Q-code separating means for delivering a Q-code CRC (Cyclic Redundancy Check) determination signal resulting from a CRC-based error check on the basis of the synchronization information and the demodulated main data, a Q-code data symbol, and a sub-code synchronization signal generated by performing a synchronization protection on the synchronization information, Q-code buffering means for reading time/position information from the Q-code data symbol, an interleave RAM for storing the main data and the sub-code synchronization signal, error correcting/memory control means for receiving symbols including the sub-code synchronization signal and the main data to perform a CIRC (Cross Interleaved Reed-Solomon Code) error correction thereon, managing addresses of a margin address area in each symbol area stored in the interleave RAM through a FIFO operation, storing the symbols including the sub-code synchronization signal in an empty area of the interleave RAM on a frame-by-frame basis, and delivering the sub-code synchronization signal and main data which are read from the interleave RAM in synchronization, a flag RAM for storing the result of the error correction, a memory controller for receiving the main data and the sub-code synchronization signal read from the interleave RAM through the error correcting/memory control means, a buffer memory for storing the main data in synchronization with the sub-code synchronization signal, and a CPU (Central Processing Unit) for managing the main data in association with the Q-code data symbol, and conducting a control for storing the main data in the buffer memory and an optical position control for the optical recording medium.

As described above, the optical disk playback apparatus according to the present invention manages the addresses with a FIFO area in a manner similar to the main data by writing the sub-code synchronization signal included in the sub-code as well as the main data in an empty area of the interleave RAM in CIRC decoding. In this way, the sub-code synchronization signal read from the interleave RAM can be synchronized with the main data. Thus, the optical disk playback apparatus can control the start of writing decoded data into a buffer memory with the aid of the sub-code synchronization signal synchronized with the decoded data read from the interleave RAM, thereby ensuring the continuity of data on the buffer memory even if the apparatus once stops and resumes a sequence of operations which involve reading data from an audio CD, decoding the read data, and storing the decoded data in the buffer memory.

Also, since the optical disk playback apparatus according to the present invention uses only the sub-code synchronization signal written into or read from the interleave RAM or flag RAM, decoded data can be exactly buffered with a smaller increase in the amount of hardware than the conventional apparatus.

The above and other objects, features, and advantages of the present invention will become apparent from the following description with reference to the accompanying drawings which illustrate an example of the present invention.

BRIEF DESCRIPTION OF THE DRAWINGS

FIG. 2 is a timing chart for describing an example of conventional disk playback method;

FIGS. 11A to 11E are diagrams for describing how an underflow or an overflow occurs in a FIFO area;

DETAILED DESCRIPTION OF THE INVENTION

Beginning with a general overview on the present invention, an optical disk playback apparatus according to the present invention writes not only decoded main data symbols (hereinafter called the "main data") into an interleave RAM (Random Access Memory) but also a 1-bit sub-code synchronizaton signal included in a sub-code into an empty region of the interleave RAM in CIRC (Cross Interleaved Reed-Solomon Code) decoding to manage the address with a FIFO (First-In First-Out) area in a manner similar to the main data, such that the sub-code synchronization signal read from the interleave RAM can be synchronized with the main data. Consequently, the sub-code synchronization signal synchronized with the main data read from the interleave RAM can be relied on to control when to start writing the decoded data (i.e., main data) into a buffer memory, so that the continuity of data can be ensured on the buffer memory even if a sequence of operations is once stopped and resumed in reading data from an audio CD, decoding the read data, and storing the decoded data in the buffer memory.

Figure 1:
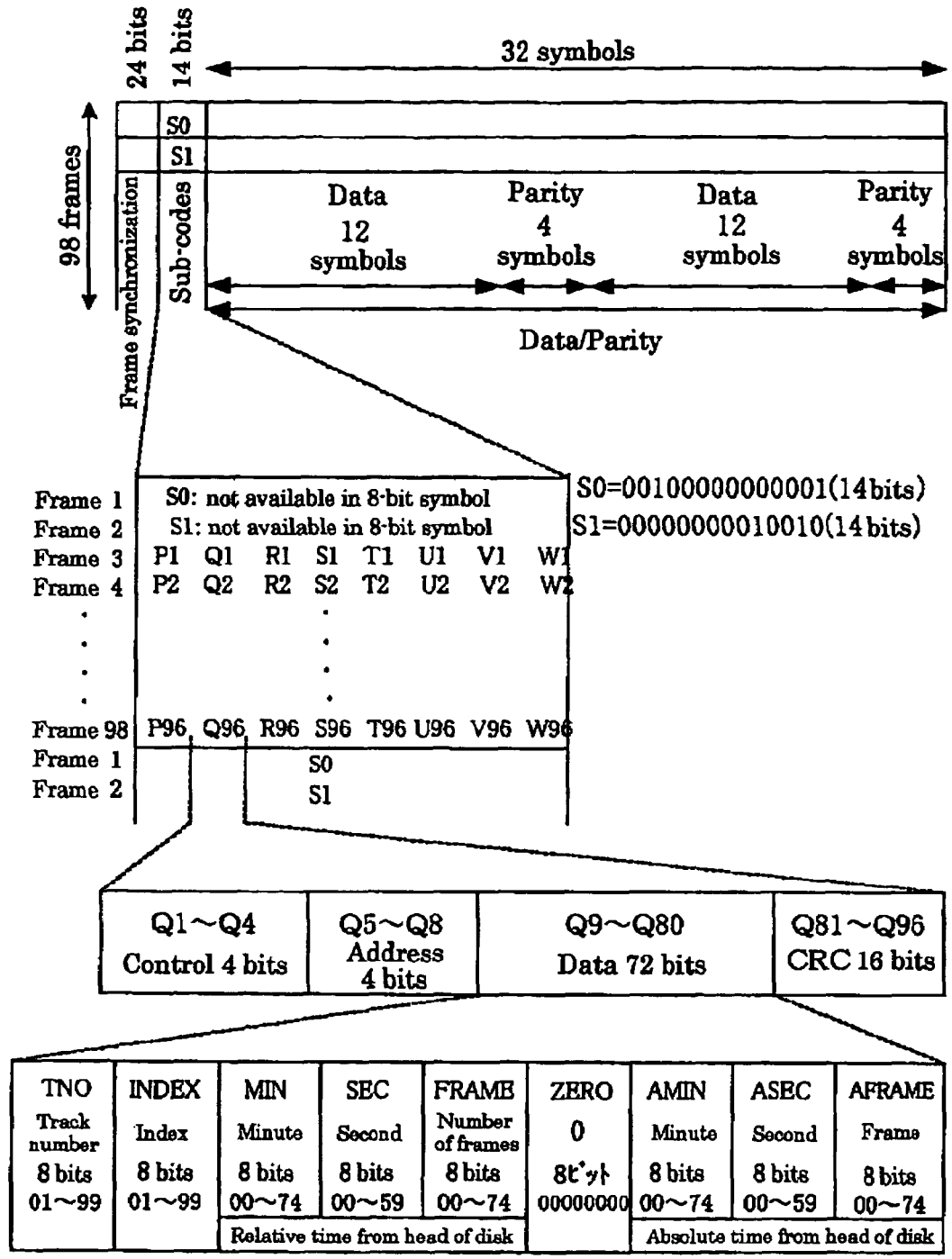
FIG. 1 is a diagram showing a data format on a CD.
Figure 3A:
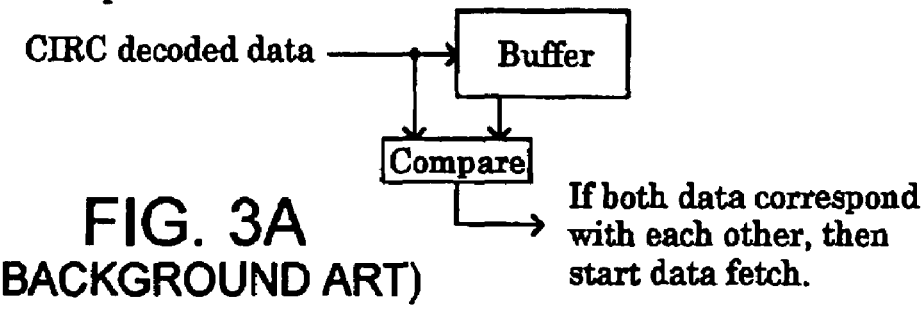
FIGS. 3A to 3C are diagrams for describing various manners of conventional disk playback methods.
Figure 3B:
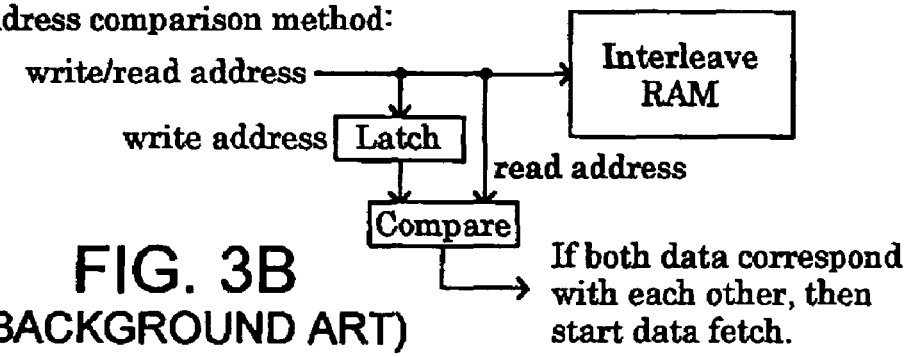
Figure 3C:
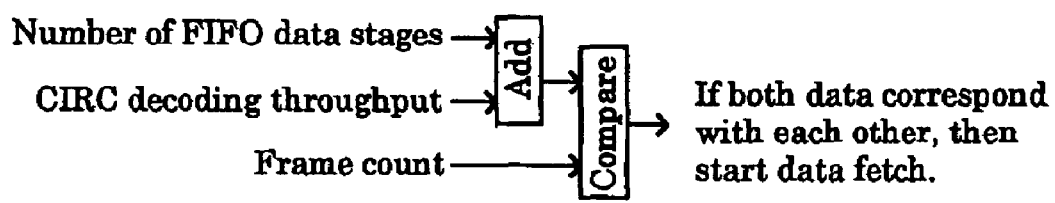
Figure 4:
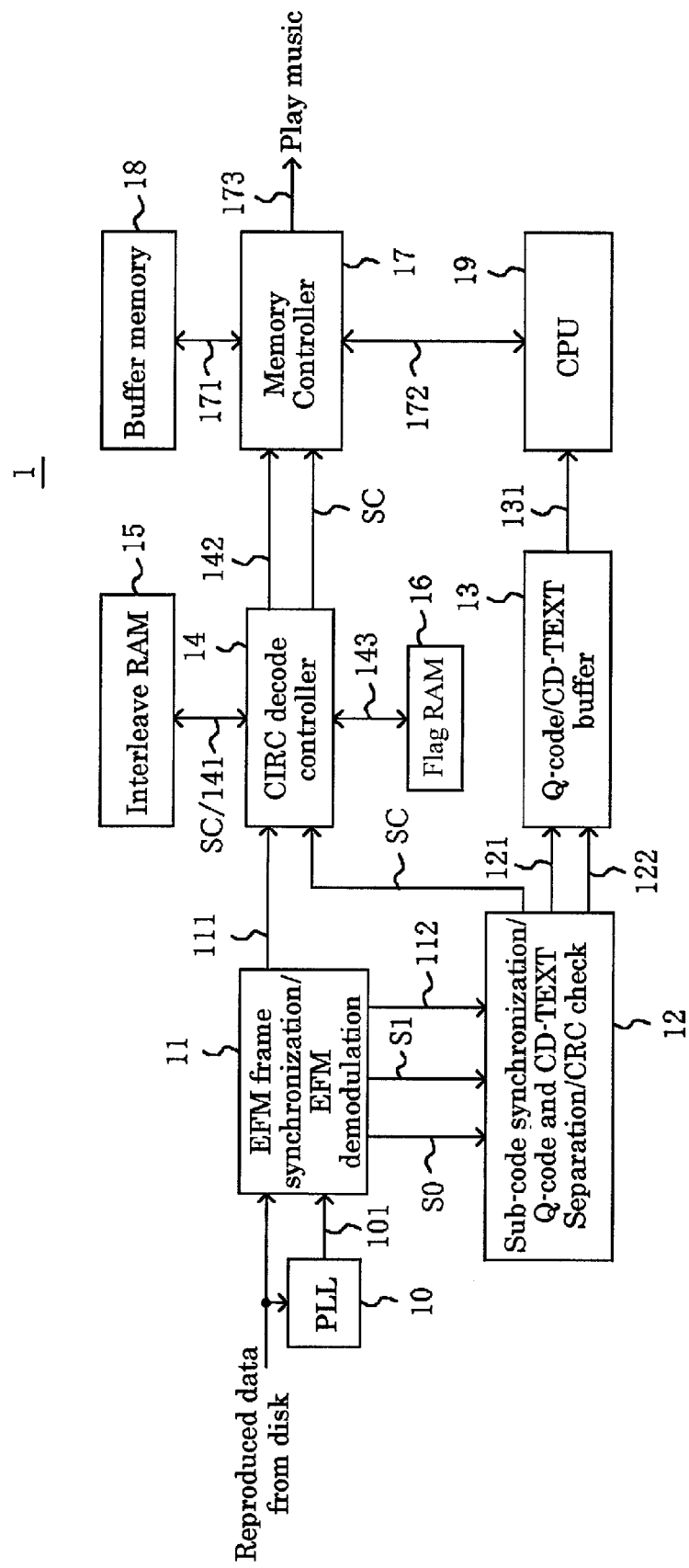
FIG. 4 is a block diagram illustrating an optical disk playback apparatus according to a first embodiment of the present invention.
Figure 5:
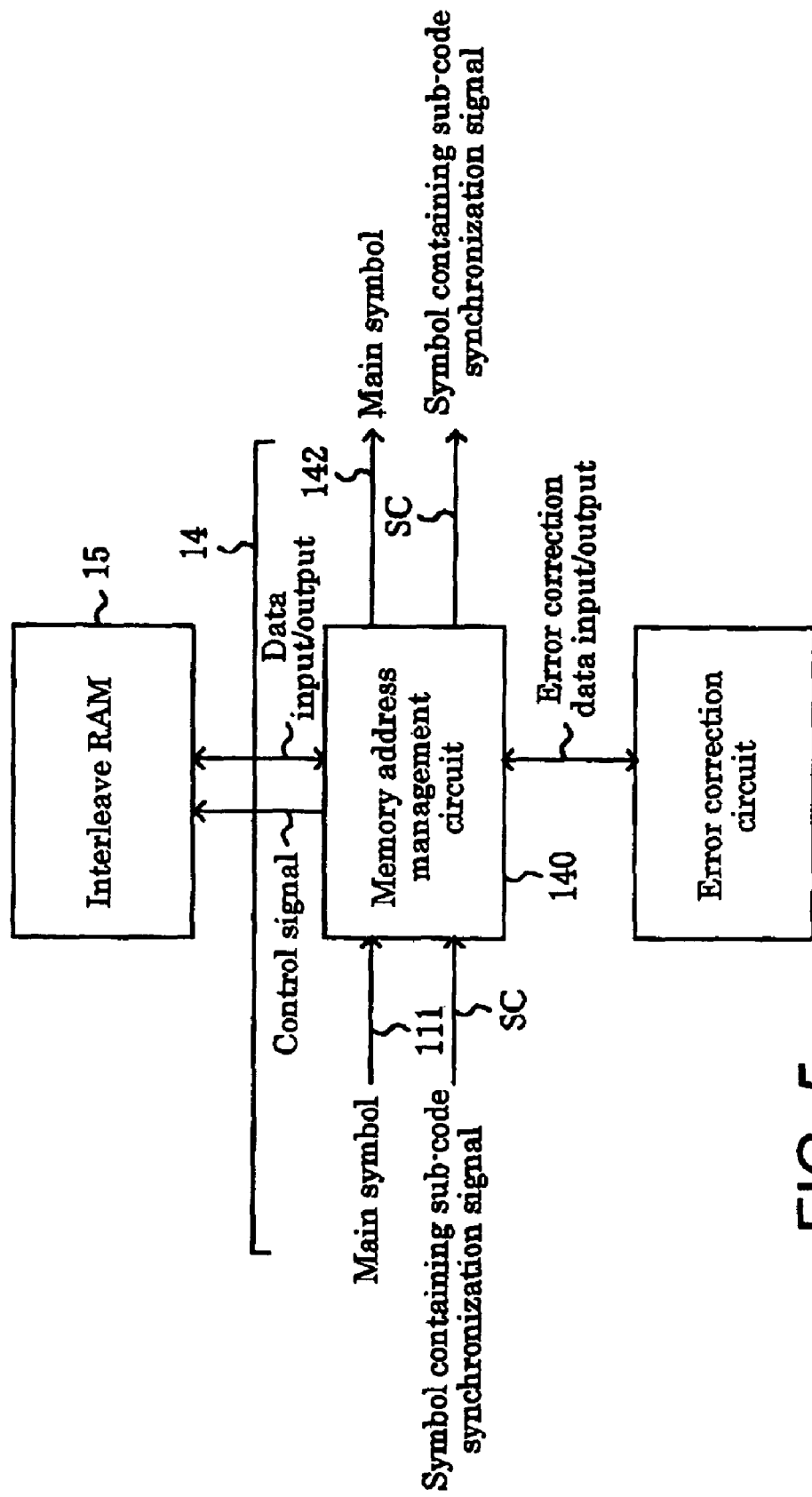
FIG. 5 is a block diagram illustrating the internal configuration of a CIRC decode controller.

FIG. 4 illustrates the configuration of an optical disk playback apparatus according to a first embodiment of the present invention, and FIG. 5 illustrates the configuration of a memory address management circuit in a CIRC decode controller provided in the optical disk playback apparatus.

In optical disk playback apparatus 1, data read from a disk such as a CD (compact disk) is applied to EFM (Eight-to-Fourteen Modulation) frame synchronization/EFM demodulation circuit 11 and to PLL (Phase Locked Loop) circuit 10. EFM frame synchronization/EFM demodulation circuit 11 is also applied with bit clock 101 generated by PLL circuit 10.

EFM frame synchronization/EFM demodulation circuit 11 delivers 8-bit main data 111 decoded from main data 111, which has a length of 16 bits upon modulation, to CIRC decode controller 14. EFM frame synchronization/EFM demodulation circuit 11 also delivers signals indicative of synchronization information S0, S1 of sub-codes as well as sub-code symbol bits (P to Q) 112 to sub-code synchronization/Q-code and CD-TEXT separation/CRC check circuit 12.

Sub-code synchronization/Q-code and CD-TEXT separation/CRC check circuit 12 applies CIRC decode controller 14 with a symbol including sub-code synchronization signal SC, which has been protected for synchronization. Sub-code synchronization/Q-code and CD-TEXT separation/CRC check circuit 12 also applies Q-code/CD-TEXT buffer circuit 13 with Q-code CRC determination result signal 121 and Q-code 122.

Between CIRC decode controller 14 and interleave RAM 15 and between CIRC decode controller 14 and flag RAM 16, data are applied and delivered for writing into and reading from the respective RAMs, and control signals are also applied for such operations.

CIRC decode controller 14 applies memory controller 17 with main data 141, which is decoded data, and with sub-code synchronization signal SC indicative of a timing at which buffering Is started. Memory controller 17 receives and delivers the main data which is written into or read from buffer memory 18, and also delivers a control signal therefor. Q-code/CD-TEXT buffer circuit 13 applies CPU (Central Processing Unit) 19 with time/position information of main data read from the disk. CPU 19 applies memory controller 17 with a signal for controlling memory controller 17.

Next, description will be made on functions of the respective components in the configuration described above.

PLL circuit 10 generates bit clock 101 from main data and associated sub-codes which are read from an optical recording medium (not shown) that has recorded thereon the main data and sub-codes.

EFM frame synchronization/EFM demodulation circuit 11 receives bit clock 101, the main data and sub-codes to detect synchronization information from the sub-codes, and demodulate and decode 16-bit EFM modulated main data to 8-bit main data 111 which is then delivered therefrom.

Sub-code synchronization/Q-code and CD-TEXT separation/CRC check circuit 12 performs a CRC error check based on synchronization information S0, S1 and the sub-codes detected by EFM frame synchronization/EFM demodulation circuit 11, and delivers Q-code CRC determination result signal 121 which is the result of the check, a Q-mode data symbol and associated CD-TEXT 122, and symbols including synchronization protected sub-ode synchronization signal SC.

Q-code/CD-TEXT buffer circuit 13 reads time/position information from CRC error determination result signal 121 as well as the Q-code data symbol and associated CD-TEXT 122, and delivers the read time/position information.

CIRC decode controller 14 receives the symbols including synchronization protected sub-code synchronization signal SC, as well as main data 111, performs CIRC error correction (C1) on main data 111.

Memory address management circuit 140 manages addresses in a data input/output area of interleave RAM 15 through FIFO operations based on main data 111 and synchronization protected sub-code synchronization signal SC which are applied thereto. Memory address management circuit 140 also delivers main data 141 and sub-code synchronization signal SC in response to a control signal.

Interleave RAM 15 stores incoming main data 111 under control of memory address management circuit 140, with its memory addresses being managed through FIFO operations, and stores sub-code synchronization signal SC at an empty location in a storage area for main data 111 on a frame-by-frame basis. Interleave RAM 15 also delivers stored sub-code synchronization signal SC as sub-code synchronization signal SC synchronized with main data 141.

Flag memory or flag RAM 16 stores CIRC error correction result 143.

Memory controller 17 receives main data 141 and sub-code synchronization signal SC read from interleave RAM 15 through CIRC decode controller 14.

Buffer memory 18 communicates main data 171 with memory controller 17 in synchronization with sub-code synchronization signal SC.

CPU 19 manages main data 172 in association with Q-code data, and conducts a control for storing main data 172 in buffer memory 18 and a control for an optical position on an optical recording medium.

In disk playback apparatus 1 having the foregoing configuration and basic functions, modulated data read from a disk is applied to EFM frame synchronization/EFM demodulation circuit 11 and PLL circuit 10. PLL circuit 10 generates bit dock 101 which is in phase synchronization with the modulated data read from the disk. Bit clock 101 is applied to EFM frame synchronization/EFM demodulation circuit 11 which relies on bit clock 101 for its operations.

EFM frame synchronization/EFM demodulation circuit 11 detects an EFM frame synchronization pattern from the modulated data read from the disk, and separates 14-bit sub-code synchronization information S0, S1 and 32 pieces of 14-bit main data from an EFM frame comprised of 588 bits. After the separation of 32 pieces of 14-bit main data 111, EFM frame synchronization/EFM demodulation circuit 11 performs EFM demodulation on associated sub-code synchronization information S0, S1 and on each of 14-bit symbols which constitute main data symbols 111. Through the EFM demodulation, 14-bit sub-code synchronization information S0, S1 is converted to a determination signal indicative of sub-code synchronization information S0, S1 or not, or to 8-bit sub-code synchronization information. Each of 14-bit main data 11 is converted to 8-bit main data symbols.

The signal indicative of sub-code synchronization information S0, S1 and sub-code symbols P, Q, R, S, T, U, V, W which are 8 bits in total are applied to sub-code synchronization/Q-code and CD-TEXT separation/CRC check circuit 12 which detects a sub-code frame comprised of 98 EFM frames which begins with synchronization information S0 and synchronization information S1 in this order. On the other hand, only Q-bit is separated from eight 1-bit sub-code symbols P, Q, R, S, T, U, V, W in 96 frames except for S0, S1. As a result, 12-bytes of Q-code data (=1 (bit/frame)×96 frames) are separated per sub-code frame. Lower two bytes (Q81 to 096) of 12-byte Q-code data are parities, and upper ten bytes (Q1 to Q80) are time/position information.

The Q-code data having the parities inverted is applied to a CRC checker which is represented by:

$$P(x)=x^{16}+x^{12}+x^{5}+1$$

and Q-code data determined as passed (OK) can be read in Q-code/CD-TEXT buffer 13.

For detecting the sub-code frame in sub-code synchronization/Q-code and CD-TEXT separation/CRC check circuit 12, sub-code synchronization information S0, S1 is protected for synchronization, so that if any of sub-code synchronization information S0, S1 is not detected in one period of 98 EFM frames, a synchronization protection operation is performed by inserting synchronization information S0, S1, or ignoring applied sub-code synchronization information a predefined number of times in defiance of the 98 EFM frame period.

Symbols including synchronization protected sub-code synchronization signal SC is delivered to CIRC decode controller 14. Since the first embodiment is configured to decode the Q-code and CD-TEXT in sub-code synchronization/Q-code and CD-TEXT separation/CRC check circuit 12 prior to interleave RAM 15, the symbols only need to include the sub-code synchronization signal, so that the symbol including sub-code synchronization signal SC is represented, for example, by [Sub-Code Synchronization Signal, 0, 0, 0, 0, 0, 0, 0].

Referring to FIG. 5, CIRC decode controller 14 communicates, with interleave RAM 15, control signals associated with addressing, write, read and the like, and input/output signals (main data, SC) 141 which include an input signal that is a mixture of sub-code synchronization signal SC and main data 111, and an output signal in which sub-code synchronization signal SC is separated from main data 142.

The control signals and input/output signals communicated with interleave RAM 15 are also applied to and delivered from CIRC decode controller 14, whereas an access to data in interleave RAM 15 is also regarded as data input/output closed within CIRC decode controller 14.

Main data 111 applied from EFM frame synchronization/EFM demodulation circuit 11 is stored in interleave RAM 15, while a C1 syndrome operation is performed on four upper parity symbols of main data 111. Here, upper 28 symbols (12 data symbols, four parity symbols and 12 data symbols) included in 32 symbols of one EFM frame are exclusively stored in interleave RAM 15, whereas lower four C1 parity symbols are not stored in interleave RAM 15, nor is subjected to the error correction.

Since each odd-numbered symbol and each even-numbered symbol extend over two EFM frames in a 1-delay relationship, the C1 syndrome operation finishes for one frame at the time two EFM frames are applied. Two series of data, odd-numbered symbols and even-numbered symbols, exist for holding the syndrome operation. A C2 syndrome operation and a C2 error correction are performed on 28 symbols of main data 141 stored in interleave RAM 15 which are released from an interleave delay.

CIRC decode controller 14 determines and corrects errors based on the result of the syndrome operation on the main data. The C1 correction is capable of correcting errors up to two symbols. Thus, by storing the result of the C1 error correction as flags in flag RAM 16 in units of frames, the C2 error correction is capable of correcting errors of up to two symbols, and correcting up to four missing symbols by referring to the flags.

The main data comprised of 28 symbols, which have undergone the C1 error correction, de-interleaving and C2 error correction, are de-scrambled and released from 2-delay, and frames each comprised of 24 symbols, or 12 symbols each comprised of 16-bit data as audio data, are sequentially read from interleave RAM 15, and delivered to buffer memory 18 as decoded data from CIRC decode controller 14 through memory controller 17.

In an audio CD, for intermediate value interpolation, a portion of main data (i.e., decoded data) read from interleave RAM 15, which has been determined to be erroneous data in the C2 error correction, is replaced with the preceding and subsequent intermediate values of normal data in units of 16-bit data.

In the CIRC decoding, interleave RAM 15 and flag RAM 16 are used as ring buffers, respectively, wherein the address makes a round to the lowest minimum address after the highest address is reached. Specifically, in a new frame, the address at which data is written or read is incremented, and makes a round to the lowest address, i.e., zero address after the highest address is reached, so that the addressing circulates a RAM address space with a fixed use area of respective RAMs 15, 16.

EFM frame synchronization/EFM demodulation circuit 11 relies on bit clock 101 generated by PLL circuit 10 for its operation, while other circuits rely on a quartz-based clock at a fixed frequency for their operations.

Though using different operation clocks, in a steady state in which the disk is stably rotating, the EFM frame comprised of 32 symbols, which is applied to CIRC decode controller 14, is equal to one frame comprised of 24 symbols delivered from the CIRC decoding in the frequency of one frame which is 7.35 KHz at a single speed. However, if eccentricity of a disk or the like causes uneven rotations of the disk, data of 32 symbols comprised of 588 bits in one EFM frame will deviate from the period length of 7.35 KHz.

Interleave RAM 15 having 2,048 addresses each of which is capable of storing 8-bit data basically requires the following number of addresses if only in a steady state:

$$\begin{aligned}\text{Basic Number of Addresses} = &[\text{Data Write} + 1\text{-delay} + C1 \text{ Correction} + \\ &\text{Interleave Delay } (27D \text{ to } 0D: D=4) + \\ &C2 \text{ Syndrome} + C2 \text{ Correction} + 2\text{-delay} + \text{Data Read}].\end{aligned}$$

Considering the basic number of addresses, even if one address is assigned to each of locations for 28 symbols in a flow of [Data Write+C1 Correction+C2 Syndrome+C2 Correction+Data Read], the addresses of [C2 Correction+Data Read] are not required for parities, so that these addresses may be 24 symbols, respectively. Thus, since the 1-delay has 14 symbols, the 2-delay has 12 symbols, the interleave delay is equal to [27×D+ . . . +0×D], where D=4, the number of addresses in the memory area in the steady state is calculated as follows:

$$\begin{aligned}\text{Number of Addresses} = &(\text{Data Write} + C1 \text{ Correction} + C2 \text{ Syndrome} + \\ &C2 \text{ Correction} + \text{Data Read}) \times 28\end{aligned}$$

Therefore, an address space required for interleave RAM 15 can be calculated as follows:

$$\begin{aligned}\text{Required Address Space} = &(\text{Data Write} + C1 \text{ Correction} + C2 \text{ Syndrome} + \\ &C2 \text{ Correction} + \text{Data Read}) \times 28 + (1\text{-delay}) \times 14 + \\ &(2\text{-delay}) \times 12 + (27 + 26 + \ldots + 1 + 0) \times 4 \\ = &(28 \times 5) + 14 + (108 \times 14) + 12 \times 2 \\ = &140 + 14 + 1512 + 24 \\ = &1{,}690 \text{ addresses}\end{aligned}$$

In this event, interleave RAM 15 having 2,048 addresses each of which is capable of storing 8-bit data has an empty area as wide as:

2,048−169=358 addresses.

In the foregoing configuration, an address at which data is written is adjacent to the C1 correction address when there is not 1-delay, and respective symbol areas are also adjacent to each other. Thus, when data is read from a disk at a higher data rate, a data write address and a C1 correction address at the same symbol position interfere with each other. Conversely, if data is read at a lower data rate, a data write address is interfered by a data read address of an adjacent symbol.

To address these interferences, a method employed in this embodiment provides margins for a data write address and a C1 correction address of the same symbol position, and a data read address of a symbol adjacent to the data write address to accommodate fluctuations, for example, due to uneven rotations of a disk in the data rate at which data is read from the disk. Specifically, data read from a disk is captured after it is recognized by bit clock reconstructed from the data by PLL circuit 10.

Here, the capture of data is affected by the rotation of the disk. While a control is conducted to constantly rotate the disk and to read data at a fixed line velocity, eccentricity and uneven rotations of the disk disturb the line velocity, affecting the data rate of captured digital data recognized by the bit clock.

On the other hand, the system dock is based on a clock generated by a quartz crystal oscillator, and audio data is finally retrieved at a fixed rate. This is because audio data will be distorted unless final audio data is retrieved at the fixed rate of the dock from the quartz crystal oscillator.

In other words, data is captured from a disk under a situation in which the data rate can fluctuate, and finally decoded data should be retrieved at a fixed rate without fluctuations. For this purpose, a processing system responsible for decoding must absorb the difference in data rate between the capture of data and retrieval of final data. The difference in data rate may be caused by jitter or uneven rotations. Generally, the influence of the difference in data rate is absorbed by a FIFO operation forced to a RAM for storing data, and providing a region for absorbing jitter. While a register-based FIFO circuit may be placed prior to storage of data, a RAM having a proper capacity may be used for data storage so as to leave a surplus RAM capacity which permits the FIFO operation to be implemented by RAM addressing for absorbing jitter.

In this FIFO operation, captured data is sequentially stored or written in sequential addresses, and when data is read for processing, data are used from "old" addresses spaced away from the foregoing write address.

Figure 7:
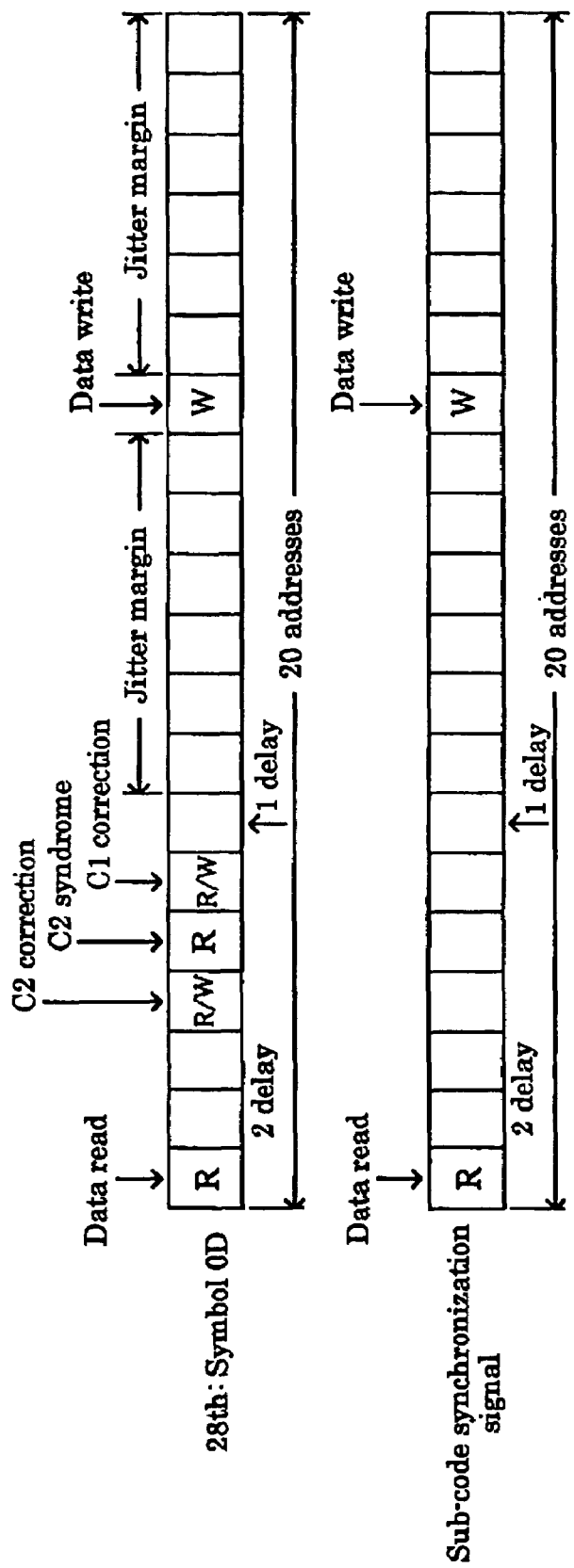
FIG. 7 is a diagram showing an assignment of addresses in a symbol area within an interleave RAM.

In FIG. 7, later described, assuming that the addresses are feed, old data are stored on the left side, while new data are stored at a data write position "W" which sequentially moves to the right. On the other hand, data read "R" or read/write "R/W" for processing is spaced away from "W" and gradually moves to the right as well. When data is captured at a data rate equal to that of data processing, "W" and "R" or "R/W" move to the right while their positional relationship remains unchanged.

Considering a phase relationship rather than the fixed address in FIG. 7, when data is captured at a data rate equal to that of data processing, the relationship between "W" and "R" or "R/W" remains unchanged, and as a new frame appears, the respective addresses are incremented by one.

When the data rate at which data is captured fluctuates, for example, when the data rate becomes lower, "W" moves slower, but there is not a significant change in the processing speed, so that the distance between the addresses of "W" and "R" or "W/R" becomes shorter. When the data rate becomes higher, "W" moves faster, so that the distance between "W" and "R" or "R/W" becomes larger. As appreciated, the phase relationship between data write "W" and data processing "R" or "R/W" fluctuates depending on the data rate at which data is captured.

The distance between "W" and "R" or "R/W" increases or decreases depending on fluctuations in the data rate, and the FIFO operation is performed to permit normal operations even if the data rate fluctuates.

When data is captured at a low data rate, addresses between "W" and "R" or "R/W" will be used up, causing "W" to interfere with "R" or "R/W," resulting in failed normal processing.

While the foregoing description is made on an area on a RAM for one symbol, respective symbol areas are arranged adjacent to each other on the RAM, so that if data is captured at a high data rate to separate "W" of a certain symbol from "R" or "R/W," "R" or "R/W" of a symbol adjacent to "W" is closer to "W" of a symbol adjacent to "R" or "R/W," in which case normal processing is failed if adjoining symbols interfere with each other.

Therefore, the address margin can absorb jitter with an image of the number of FIFO stages. Specifically, an address at which data is read is different from an address at which data is written because a jitter margin is provided in the address space to permit a normal operation through a FIFO operation even if data is captured at a fluctuating data rate.

When the jitter margin is provided in the interleave RAM, a margin of six addresses may be reserved between a data write address and a C1 correction address or a 1-delay address of the same symbol position, and a margin of six addresses may be reserved between the data write address and a data read address of the next symbol, in which case:

$$(6+6) \times 28 = 336 \text{ addresses}$$

are added to usable addresses which sum up to:

$$1{,}690 + 336 = 2{,}026 \text{ addresses}.$$

In this event, the address margin is comprised of six addresses each before and after the data write addresses, wherein the FIFO operation is performed a number of times corresponding to seven addresses in an initial state, to one address at minimum, and 13 addresses at maximum. Even in this case, there are 22 empty addresses in the interleave RAM which has 2,048 addresses.

Figure 6:
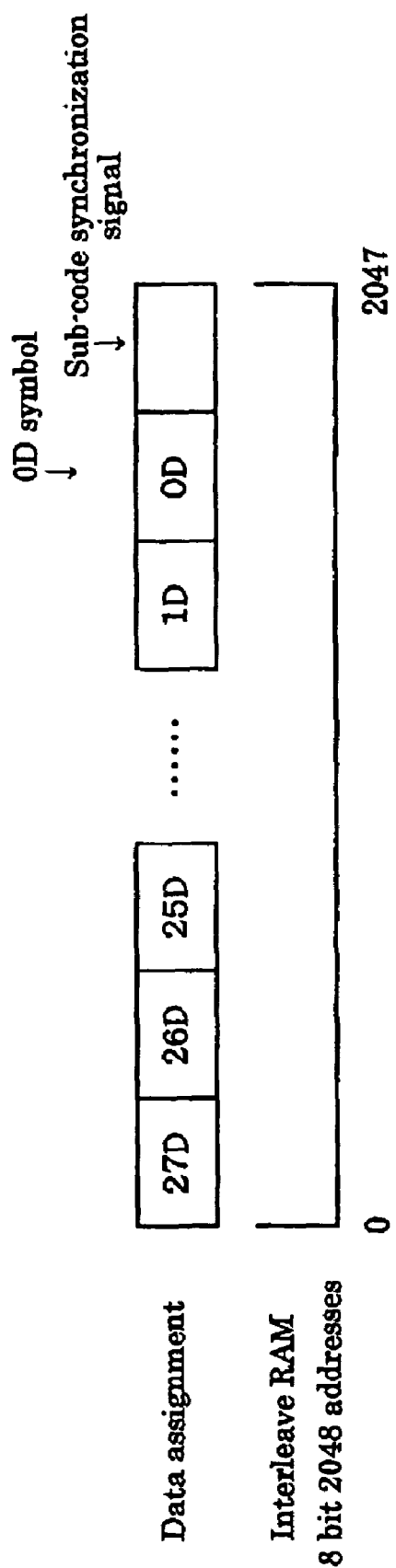
FIG. 6 is a diagram showing an assignment of addresses in a use area of the 28th symbol 0D which has the shortest interleave delay of 0×D.

In the foregoing configuration having the margin addresses, referring to FIG. 6 which shows an address assignment in a use area of 28th symbol 0D which presents the shortest interleave delay of 0×D, the upper column shows the address assignment within the symbol, and the lower column shows 28th symbol 0D.

The addresses used by the 0D symbol is calculated as follows:

$$\begin{aligned}
\text{Used Addresses} = &\ (\text{Data Write} + 1\text{-delay} + C1 \text{ Correction} + \\
&\ \text{Interleave Delay } (0 \times D: D = 4) + C2 \text{ Syndrome} + \\
&\ C2 \text{ Correction} + 2\text{-delay} + \text{Data Read}) + \\
&\ \text{Margin Addresses } (6 + 6) \\
= &\ 20 \text{ addresses}
\end{aligned}$$

Bearing in mind that the aforementioned 0D symbol uses 20 addresses, consider a storage area for the sub-code synchronization signal. Sub-code synchronization signal SC delivered from sub-code synchronization/Q-code and CD-TEXT separation/CRC check circuit 12 to CIRC decode controller 14 is read from and written into the interleave RAM once per frame. In address management, as is the case with the 28th symbol having the shortest interleave delay of 0×D, sub-code synchronization signal SC is stored in interleave RAM 15, which has the margin addresses, under delay control which may involve a FIFO operation in a data write, whereby sub-code synchronization signal SC read from interleave RAM 15 is synchronized with main data (i.e., decoded data) similarly read from interleave RAM 15.

Referring again to FIG. 6 which shows an area in which symbols are stored in interleave RAM 15, there are shown the locations of symbol areas and sub-code synchronization signal area in interleave RAM 15. In interleave RAM 15 having 2,048 addresses, the areas of symbol 27D to 0D are adjacent to each other, and the area of sub-code synchronization signal SC is adjacent to the 0D symbol.

Figure 14:
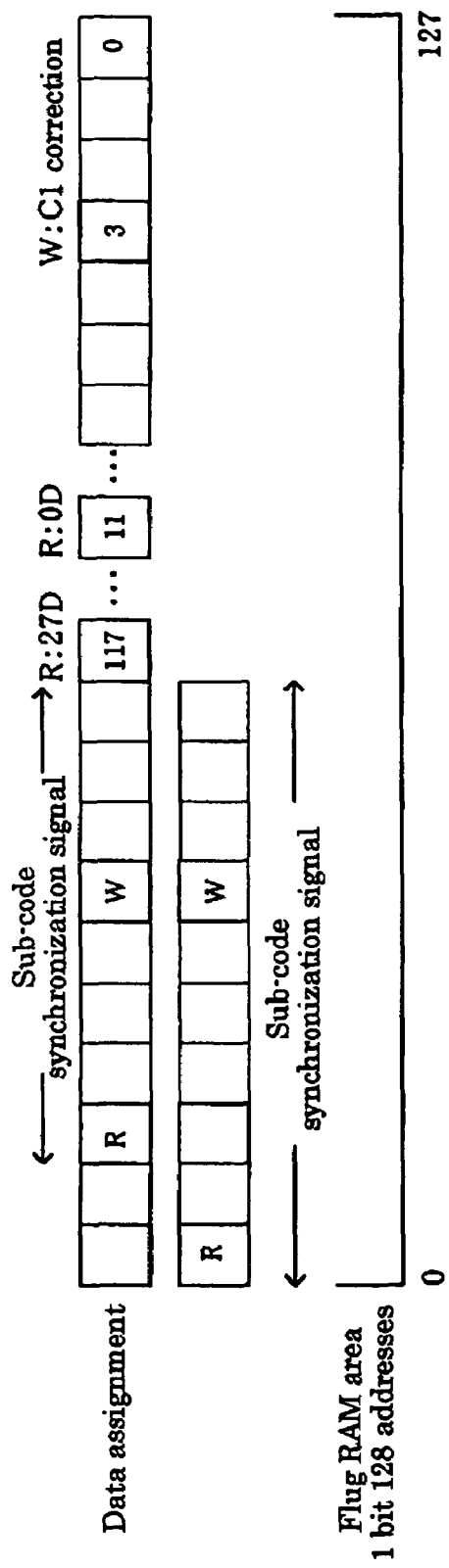
FIG. 14 is a diagram showing an assignment of addresses when a sub-code synchronization signal is written into a flag RAM.

It should be understood that the address area for the sub-code synchronization signal in FIG. 6 is an area reserved for storing the sub-code synchronization signal next to the 0D area in FIG. 7. The area for storing sub-code synchronization signal SC has 20 addresses equal to the area used by the 0D symbol. While the sub-code synchronization signal is stored next to the 0D area, it may be stored before a 27D area, as shown in FIG. 14, later described.

Sub-code synchronization signal SC read from interleave RAM 15, i.e., sub-code synchronization signal SC synchronized with main data 142 is delivered from CIRC decode controller 14 to memory controller 17 which forces buffer memory 18 to start capturing main data (i.e., decoded data) 171 in response to sub-code synchronization signal SC. CPU 19 controls the position of an optical head with respect to an optical disk in the radial direction, and determines the position from Q-code time/position information 131 acquired from Q-code/CD-TEXT buffer 13.

Main data 171 on buffer memory 18 is managed in units of 92×28 bytes included in the sub-code frame in association with Q-code information 131. By starting the capture of main data 171 into buffer memory 18 in response to sub-code synchronization signal SC synchronized with main data 142, main data 171 associated with Q-code information 131 can be stored in buffer memory 18 with reproducivity. This buffer memory is generally a memory for once storing audio data for purposes of shock proof, playback of CD in a personal computer, and the like. The buffer memory is different from an interleave RAM for storing data. Data is read from a disk and decoded at a higher speed (n-times faster than the standard single speed, where n is equal to or larger than one), and stored in buffer memory 18 until it is filled with the data, at which time data read from the disk is stopped, and the storage of the data in buffer memory 18 is also stopped.

Data is retrieved from buffer memory 18 at the single speed for playing music, where as data in buffer memory 18 is reduced, data is again read from the disk and decoded at a higher speed, and stored in buffer memory 18. While data is again stored in buffer memory 18, data is continuously retrieved from buffer memory 18 at the single speed for playing music without interruption. While the data is continuously retrieved from buffer memory 18 at the single speed for playing music without interruption, data is intermittently read from the disk, decoded, and stored in buffer memory 18 at a higher speed.

The foregoing operation involves segmenting continuous music data in certain units, and connecting the segmented music data on buffer memory 18. However, since the music data, which is decoded data from an audio CD, is not marked, the Q-code data included in the sub-code can only be used on the audio CD, whereas decoded data from a CD-ROM has header information.

The operation intended by the optical disk playback apparatus of this embodiment comprises detecting a position on a disk with reference to the Q-code data while reading data from the disk, starting storage of main data (i.e., decoded data) from that corresponding to the target position in buffer memory 18.

As mentioned above, the intervening FIFO operation makes inconsistent the relationship between the detection of Q-code data and the main data. Also, since it is unknown when the FIFO operation acts for which purposes, even if a certain location on a disk is played back by capturing and decoding data at that location, main data is captured at a timing which varies every time. In the present invention, to cope with this inconvenience, 1-bit sub-code synchronization signal SC is stored in the interleave RAM as a "mark" which should not essentially included in the main data to permit a FIFO management similar to that for the main data, wherein main data 171 is captured in buffer memory 18 under control of sub-code synchronization signal SC read from interleave RAM 15. In other words, the Q-code data need not be written into interleave RAM 15, but 1-bit sub-code synchronization signal works well because the only purpose is to determine the timing at which main data 171 is captured.

As described above, since the optical disk playback apparatus according to the first embodiment utilizes an empty area of interleave RAM 15 to write the sub-code synchronization signal alone into the interleave RAM 15, while the sub-code processing system remains as before, and only uses the read sub-code synchronization signal, main data can be exactly buffered without any increase in the amount of hardware from the conventional configuration or without functional disadvantages.

This optical disk playback apparatus can be reduced in circuit scale over optical disk playback apparatuses which employ a data comparison method, and an address comparison method which involves accesses to an interleave RAM. Also, in comparison with an apparatus which predicts a data timing from address values of FIFO management, the circuit scale hardly changes because a change in synchronization position only entails a change in addressing. More specifically, the optical disk playback apparatus according to this embodiment does not comprise a circuit independent of conventional functions, but adds functions to a conventional optical disk playback apparatus, and therefore involves a small increase in circuit scale and a low possibility of including systematic errors.

In a method of buffering sub-code symbols themselves or Q-code symbol, since eight bits are used for each of the symbols, synchronization information cannot be stored. The present invention, on the other hand, updates the time/position information once per sub-code frame without the need for buffering the Q-code, and only has to buffer the sub-code synchronization signal alone.

In a method of buffering sub-code symbols P to Q or a method of buffering the Q-code symbol, a buffering delay occurs in an update of Q-code data, whereas the present invention only buffers sub-code synchronization signal CS which is extracted from synchronization protected synchronization information S0, S1. The Q-code data is free from the buffering delay in the present invention, as conventionally experienced.

Next, description will be made on an optical disk playback apparatus according to a second embodiment of the present invention.

In the apparatus of the first embodiment described above, additionally stored in interleave RAM 15 is only minimum 1-bit sub-code synchronization signal SC after synchronization information S0, S1 is protected for synchronization. However, since interleave RAM 15 has a data width of eight bits, it can store up to seven bits of other data. Therefore, a Q-code CRC determination result may be stored in one of the seven bits together with sub-code synchronization signal SC. The optical disk playback apparatus of the second embodiment differs from the apparatus of the first embodiment in that data other than 1-bit sub-code synchronization signal SC are additionally stored in the interleave RAM.

Figure 8:
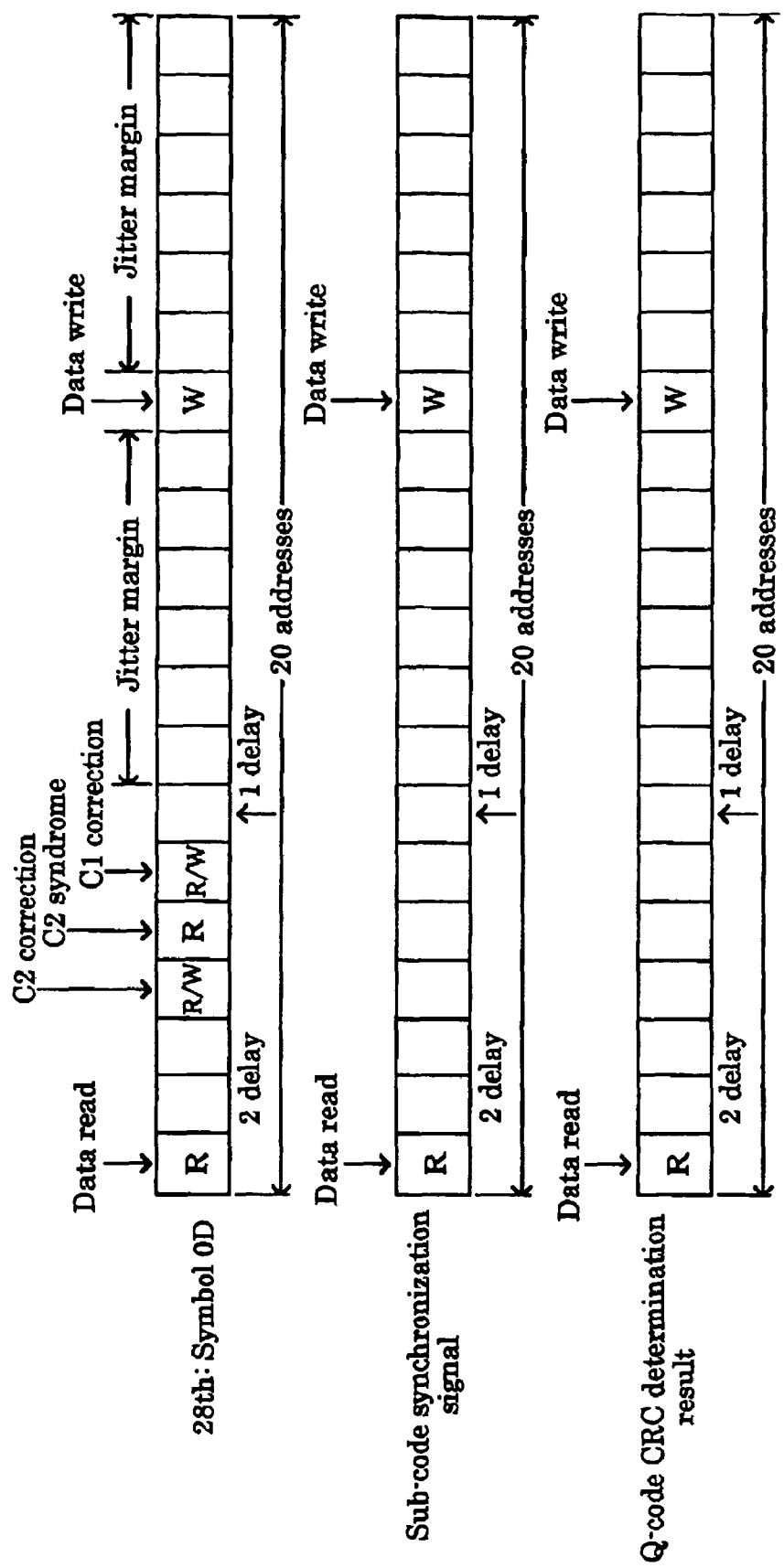
FIG. 8 is a diagram showing an exemplary assignment of addresses in a symbol area within an interleave RAM in an optical disk playback apparatus according to a second embodiment of the present invention.

Referring to FIG. 8 which shows other exemplary assignments of addresses in a symbol area within the interleave RAM in the second embodiment, only sub-code synchronization signal SC extracted from synchronization protected synchronization information S0, S1 included in a sub-code is written into an empty area of interleave RAM 15 on the playback side together with main data for absorbing jitter, whereby the address can be managed with a FIFO area in a manner similar to main data 141. When read sub-code synchronization signal SC is functioned as sub-code synchronization signal SC synchronized with main data 141, the aforementioned sub-code synchronization signal SC is stored in one of eight bits of the empty area in interleave RAM 15, and an error determination result for symbol Q out of eight 1-bit sub-code symbols P, Q, R, S, T, U, V, W included in the sub-code is stored in another bit.

Figure 9:
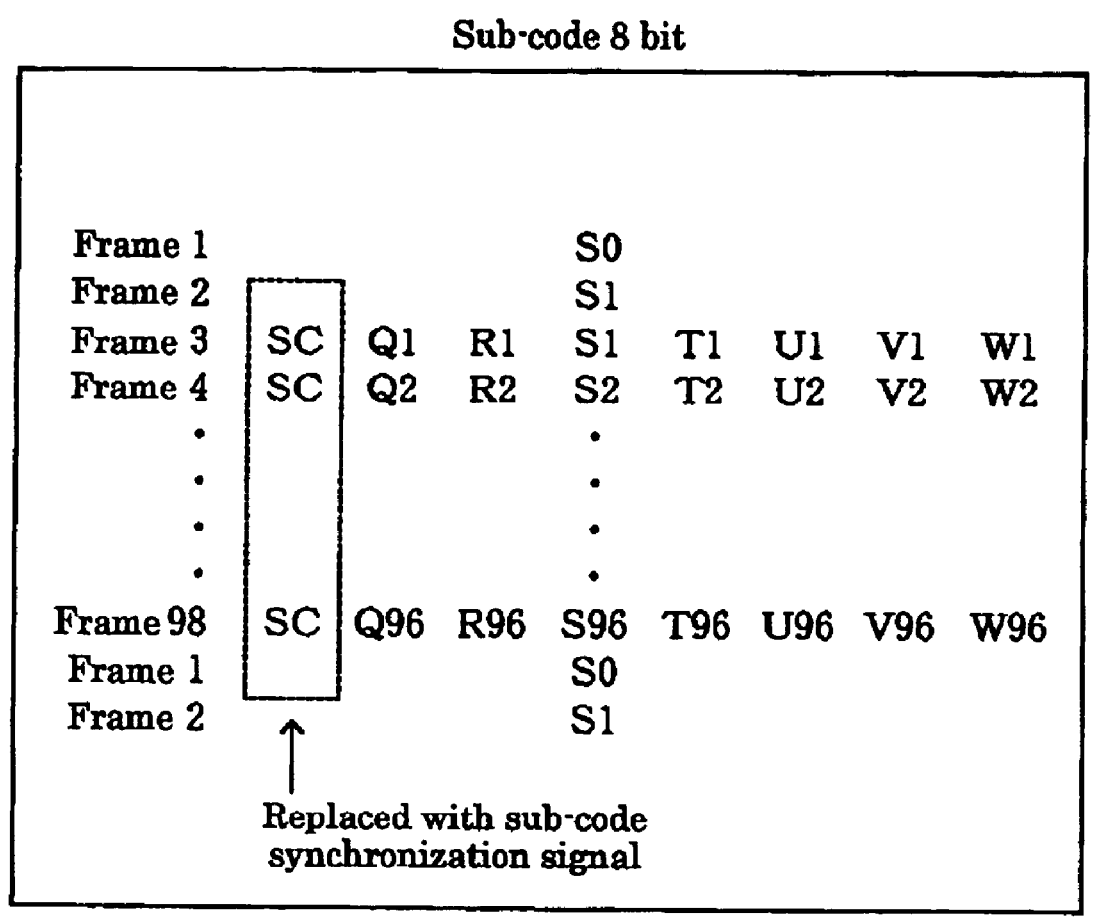
FIG. 9 is a diagram showing how P bits in sub-codes are replaced with sub-code synchronization signals.

Referring now to FIG. 9 in which a P-bit of the sub-code is replaced with the sub-code synchronization signal, though the sub-code symbols P, Q, R, S, T, U, V, W themselves cannot be stored together with the synchronization signal in eight bits, the P-bit out of sub-code symbols P, Q, R, S, T, U, V, W may be replaced with sub-code synchronization signal SC which is stored in interleave RAM 15, such that Q-code data and CD-TEXT data can be separated from retrieved data.

The separation of the Q-code and CD-TEXT refers to retrieval of the Q-bit and R-, S-, T-, U-, V-, W-bits from 96 sub-code symbols except for sub-code synchronization information S0, S1 out of 98 EFM frames included in one sub-code frame.

In other words, a rewrite of sub-code symbols involves one bit at the position of "P" rewritten to sub-code synchronization signal "SC" in such a manner that sub-code symbols "P, Q, R, S, T, U, V W" from frame 3 to frame 98 are rewritten to "SC, Q, R, S, T, U, V, W."

Figure 10:
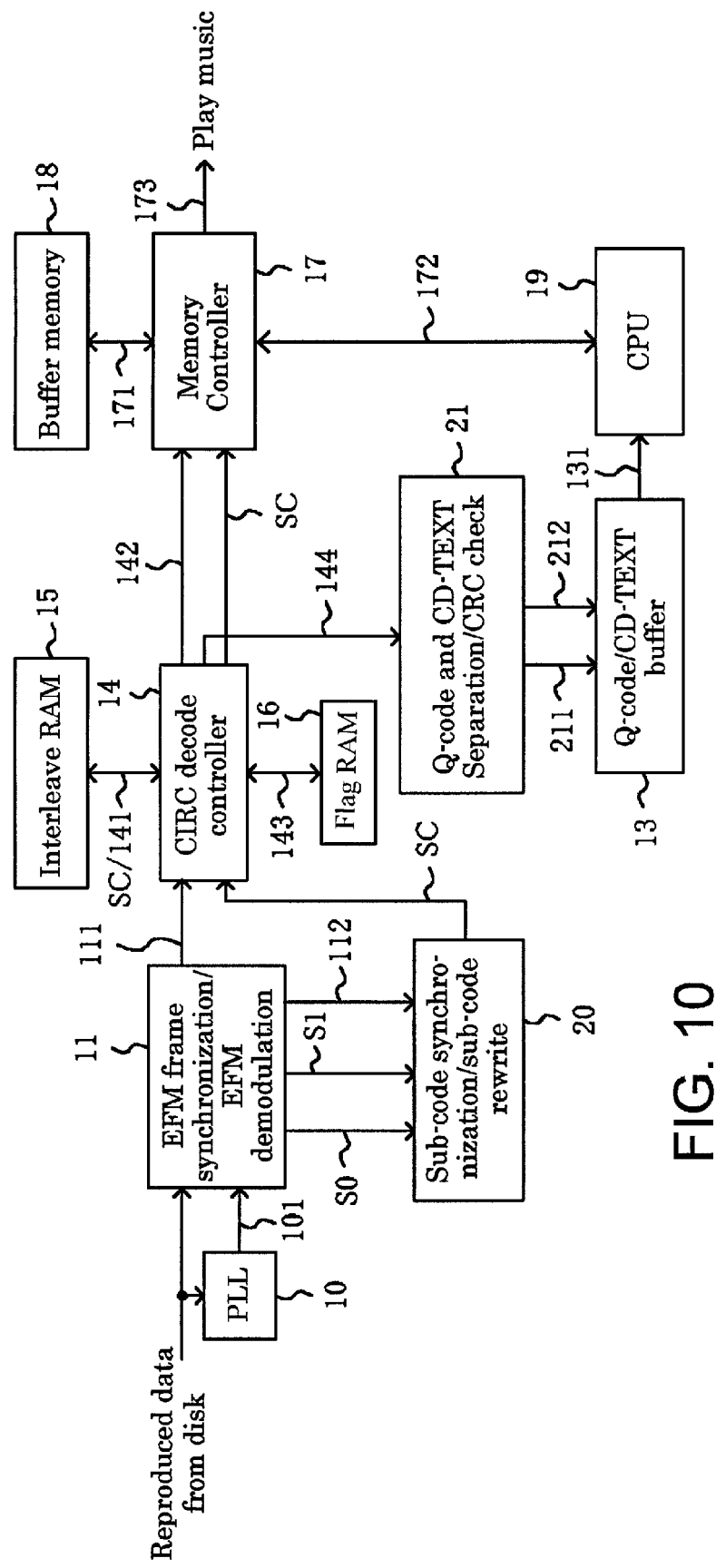
FIG. 10 is a block diagram illustrating the configuration of an optical disk playback apparatus which can separate Q-code data and CD-TEXT data from data retrieved from the interleave RAM in the second embodiment.

Referring to FIG. 10 which illustrates the configuration of the optical disk playback apparatus in this event, the second embodiment differs from the first embodiment in that the Q-code decoding and CD-TEXT decoding function included in sub-code synchronization/Q-code and CD-TEXT separation/CRC check circuit 12 are moved to the rear of interleave RAM 15.

Specifically, EFM frame synchronization/EFM demodulation circuit 11 applies sub-code synchronization/sub-code symbol rewrite circuit 20 with signals indicative of sub-code synchronization signals S0, S1 and eight 1-bit sub-code symbols P, Q, R, S, T, U, V, W 112. As described above, sub-code synchronization/sub-code symbol rewrite circuit 20 rewrites one bit at the position of "P" with sub-code synchronization signal "SC" such as rewriting sub-code symbols [P, Q, R, S, T, U, V, W] from frame 3 to frame 98 to [SC, Q, R, S, T, U, V, W], and then applies CIRC decode controller 14 with "SC, Q, R, S, T, U, V, W" including sub-code synchronization signal SC. The second embodiment also differs from the first embodiment in that a sequence of symbols in the first embodiment is comprised of [SC, 0, 0, 0, 0, 0, 0, 0].

CIRC decode controller 14 applies the sequence of symbols "SC, Q, R, S, T, U, V, W" to Q-code and CD-TEXT separation/CRC check circuit 21 as well as to interleave RAM 15.

Q-code and CD-TEXT separation/CRC check circuit 21 performs a sub-code synchronization function by detecting the periodicity of sub-code synchronization signal SC, determining sub-code synchronization, performing synchronization protection in accordance with a predefined rule, and masking synchronization signals S0, S1 which have reached without observing the periodicity to generate synchronization protected sub-code synchronization signal SC. The rest of configuration is similar to the circuit illustrated in FIG. 4.

In the Q-code, 96 bits included in 96 sub-code symbols, i.e., 12 bytes consists of ten bytes of target data and two bytes of (inverted) parity data, such that a CRC determination can be made using the 12 bytes of data. In CD-TEXT, 18 bytes included in 24 symbol units of 96 symbols consist of 16 bytes of target data and two bytes of (inverted) parity data, such that a CRC determination can be made using the 18 bytes of data when CD-TEXT Mode 4 is used. Data used herein is regarded as error free, from the result of CRC determination which shows OK.

As described above, the optical disk playback apparatus according to the second embodiment utilizes an empty area in interleave RAM 15 to write sub-code synchronization signal SC into one of the eight bits in the interleave RAM 15, and the CRC determination result alone into another bit in interleave RAM 15 in a manner similar to sub-code synchronization signal SC to only use the read sub-code synchronization signal and CRC determination result, while the sub-code processing system remains as before, decoded data can be exactly buffered without a significant increase in the amount of hardware from the conventional optical disk playback apparatus and even without functional disadvantages. In addition, even a change in synchronization position only involves a change in addressing with few changes in circuit scale, and therefore a low possibility of including systematic errors The time/position information is updated once per sub-code frame, and the Q-code need not be buffered but the sub-code synchronization signal alone need be buffered in the interleave RAM. Also, the optical disk playback apparatus of the second embodiment only buffers sub-code synchronization signal CS which is extracted from synchronization protected synchronization information S0, S1. The Q-code data is free from the buffering delay, as conventionally experienced.

Next, description will be made on an optical disk apparatus according to a third embodiment of the present invention.

In the aforementioned apparatus of the first embodiment, the address management for sub-code synchronization signal SC stored in interleave RAM 15 uses 20 addresses, as is the case with the 28th symbol which presents the shortest interleave delay of 0×D. However, for synchronizing sub-code synchronization signal SC read from interleave RAM 15 with main data 141, the delay control having margin addresses and involving a FIFO operation is only needed to be similar to the address management for main data in the storage of sub-code synchronization signal SC in interleave RAM 15. As can be understood as well from FIGS. 11A to 11E for describing how an underflow or an overflow occurs in a FIFO area, later described, when there are (6+6) margin addresses, only two addresses are required for a data write address and a data read address, in which case a sub-code synchronization signal storage area can be defined by 14 addresses in a minimum configuration.

In this way, since the optical disk playback apparatus according to the third embodiment sets a sub-code synchronization signal storage area having 14 addresses in interleave RAM 15 and writes the sub-code synchronization signal into one of eight bits in the sub-code synchronization signal storage area, while the sub-code processing system remains as before, and only uses the read sub-code synchronization signal. Thus, the optical disk playback apparatus of the third embodiment can exactly buffer main data with a smaller increase in the amount of hardware from the conventional configuration and without functional disadvantages. In addition, even a change in synchronization position only involves a change in addressing with few changes in circuit scale, and therefore a low possibility of including systematic errors. Q-code data is free from buffering delay as before.

Next, description will be made on an optical disk playback apparatus according to a fourth embodiment of the present invention.

In a conventional optical disk playback apparatus, fluctuations in the data rate at which data is read from a disk cause fluctuations in the relative position of a data write address on an interleave RAM. When margin addresses are used up, a data write address and a C1 correction address at the same symbol position will interfere with each other, or the data write address and a data read address of an adjacent symbol will interfere with each other, resulting in a failure of normal CIRC decoding. To address this problem, the optical disk apparatus of the fourth embodiment forcedly moves the relative position of a data write address to an initial state to center the addresses when the margin addresses have been used up as mentioned above, i.e., when an underflow or an overflow occurs in a FIFO area.

Referring to FIGS. 11A to 11E for describing the centering when an underflow or an overflow occurs in the FIFO area, in a situation shown in FIG. 11A, immediately after resetting (i.e., centered position), a read (R) position (address "R") is found at the head of 14 addresses (left end in the figure) of the FIFO area, and a write (W) position (address "W") is found after a jitter margin area of six addresses. Six addresses subsequent to address "W" are used for the jitter margin addresses.

With the FIFO area allocated in this way, immediately before the margin addresses are used up to cause an overflow as shown in FIG. 11B, the read (R) address is found at the head (left end of the figure) of 14 addresses of the FIFO area, while the write (W) address moves to the tail (right end of the figure) of the FIFO area. Likewise, as shown in FIG. 11C, immediately before an underflow, the read (R) address is found at the head (left end of the figure) of the 14 address of the FIFO area, while the write (W) address moves to the next to the read (R) address.

When the read (R) address is the same as the write (W) address (R=W), an underflow occurs to immediately trigger the centering of addresses. When R=W, no write is performed. Specifically, an underflow of the FIFO area causes the centering of the relationship between a write address of interleave RAM 15 and a read address of the same. Since the centering produces skipped write addresses, data read after the underflow could be one which has not been written within the same symbol, possibly delivering an erroneous symbol.

Thus, as shown in FIG. 11D, when an underflow occurs to trigger the centering, the position of "W" is shifted to the same position at the time of resetting. In this event, if sub-code synchronization signal SC is written into interleave RAM 15, data at an address to the right of "W" before a jump resulting from the centering is obsolete and indefinite data of the adjacent symbol, so that the indefinite erroneous sub-code synchronization signal would be read out if no proper action is taken. To address this problem, when the FIFO area is centered in response to an underflow of the FIFO area included in interleave RAM 15, "0" data is written into the address which is jumped to the right by the centering, thereby preventing erroneous sub-code synchronization signal SC from being read out. Alternatively, for a certain period in which addresses jumped by the centering in the FIFO area are read from the occurrence of an underflow of the FIFO area, sub-code synchronization signal SC read from interleave RAM 15 is masked. Further alternatively, rather than writing the 1-bit synchronization protected sub-code synchronization signal, a 2-bit signal decoded from sub-code synchronization information S0, S1 is stored in interleave RAM 15, and signals S0, S1 read from interleave RAM 15 may be protected for sub-code synchronization with the aid of period counting, thereby eliminating the effect of the erroneous sub-code synchronization signal through synchronization protection.

As shown in FIG. 11E, in the event of an overflow, no indefinite data will be read out because the centering causes correct data to be written from the address next to "W."

Figure 12:
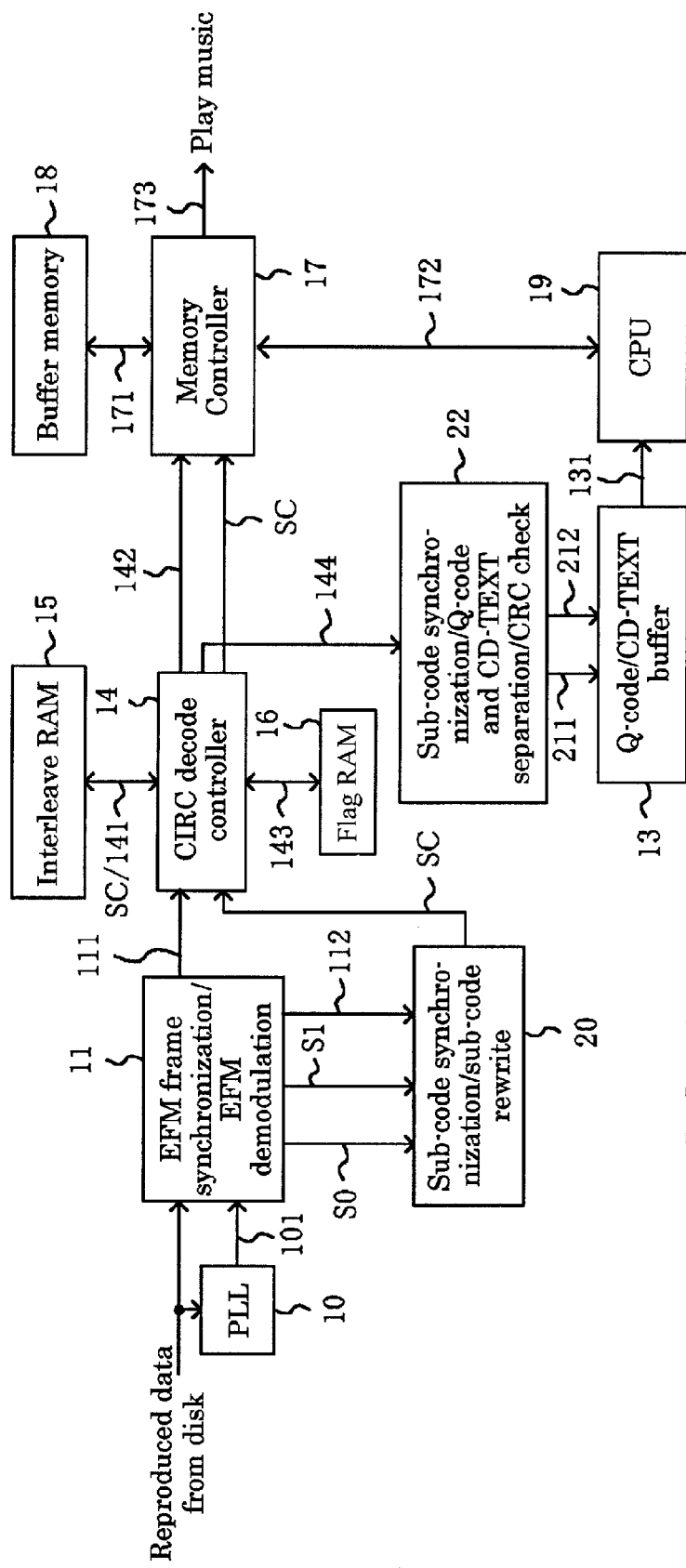
FIG. 12 is a block diagram illustrating the configuration of an optical disk playback apparatus which protects the synchronization of the sub-code using periodic counting.

Referring next to FIG. 12 which illustrates the configuration of an optical disk playback apparatus which relies on the period counting to protect the synchronization of sub-codes, the illustrated apparatus differs from the counterpart illustrated in FIG. 10 in that sub-code synchronization/Q-code and CD-TEXT separation/CRC check circuit 22 is used instead of Q-code and CD-TEXT separation/CRC check circuit 21 in FIG. 10. The rest of the configuration is similar to the apparatus illustrated in FIG. 10.

Sub-code synchronization/sub-code symbol rewrite circuit 20 in the apparatus illustrated in FIG. 12 need not perform even the synchronization protection as a sub-code synchronization function, and only has to generate 1-bit sub-code synchronization signal SC from sub-code synchronization information S0, S1. It is apparent, however, that the sub-code synchronization/sub-code symbol rewrite circuit 20 may provide the synchronization protection function if this function may be redundant with later circuits.

Sub-code synchronization/Q-code and CD-TEXT separation/CRC check circuit 22 in the fourth embodiment performs a sub-code synchronization function by detecting the periodicity of the sub-code synchronization signal, determining sub-code synchronization information S0, S1 and performing synchronization protection in accordance with a predefined rule, and masking the synchronization information which has reached without observing the periodicity to generate a synchronization protected sub-code synchronization signal.

For writing 1-bit synchronization protected sub-code synchronization signal SC into interleave RAM 15, sub-code synchronization signal SC read from interleave RAM 15 is subjected to the sub-code synchronization protection with period counting, thereby avoiding the effect of an erroneous sub-code synchronization signal by the synchronization protection. In other words, the synchronization protection circuit is duplicated.

Figure 13A:
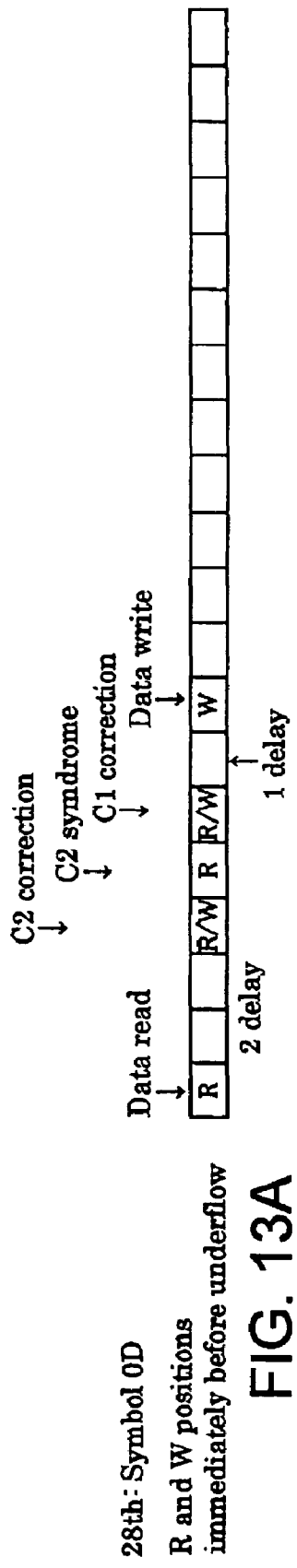
FIGS. 13A to 13C are diagrams for describing centering which is performed when an underflow or an overflow occurs in the FIFO area.
Figure 13B:
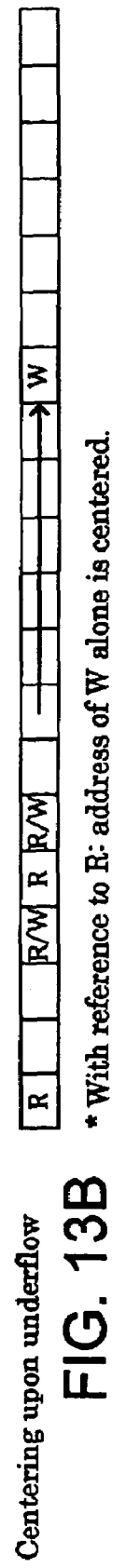
Figure 13C:
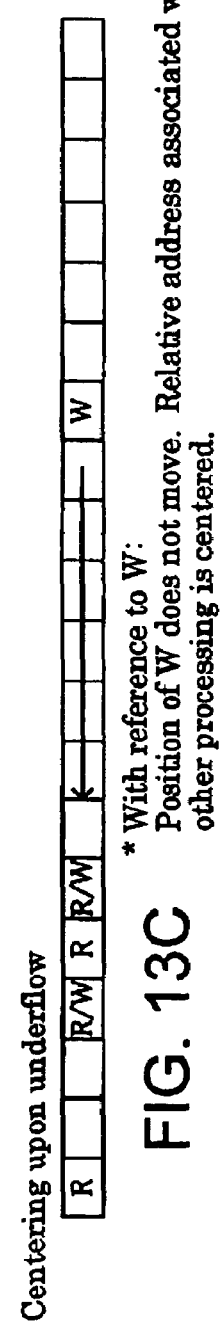

Generally, in the address management in interleave RAM 15 in the CIRC decoding, a write address is centered with reference to read address "R" in the event of an overflow or an underflow. Referring now to FIGS. 13A to 13C, description will be made on the centering which is performed when the FIFO area is underflowed or overflowed in interleave RAM 15 in the fourth embodiment. For example, description will be herein made in connection with the 28th 0D symbol in the address area having 20 addresses.

As illustrated in FIG. 13A, immediately before an underflow, a read (R) address is found at the head (left end in the figure) of the 20 addresses of the FIFO area, followed by two addresses assigned to 2-delay, one address to R/W for C2 correction, one address to "R" for C2 syndrome, one address to R/W for C1 correction, one address to 1-delay, and "W" address.

As shown in FIG. 13B, the address of "W" alone is centered with reference to "W" as before. In this event, as mentioned above, if the FIFO area included in interleave RAM 15 underflows to cause the centering of the FIFO area, "0" data is written into addresses which are jumped to the right in the figure by the centering, to avoid reading erroneous sub-code synchronization signal SC.

On the other hand, as shown in FIG. 13C, the address of "R" as well as relative addresses associated with other processing are centered together with reference to "W" rather than with reference to "R" as before. In this event, as is the case with the foregoing overflow, since the centering causes correct data to be written from the address next to "W," no indefinite data will be read out.

As described above, the read address is centered with reference to the write address in the event of an overflow or an underflow, thereby making it possible to prevent data which has not been written as the same symbol from being read after the underflow.

Next, description will be made on an optical disk playback apparatus according to a fifth embodiment. While the optical disk playback apparatuses of respective embodiments described above are configured to write sub-code synchronization signal SC into the interleave RAM, the present invention can alternatively store sub-code synchronization signal SC in the flag RAM rather than the interleave RAM. The optical disk playback apparatus according to the fifth embodiment is configured to store sub-code synchronization signal SC in the flag RAM.

In this configuration, since the flag RAM generally has 128 addresses with a data width of one bit, sub-code synchronization signal SC which can be stored in the flag RAM must be modified to have one bit. Since the flag RAM does not have an empty address area as wide as the interleave RAM, the flag RAM can be used to store sub-code synchronization signal SC, provided that the FIFO area has up to (3+3) margin addresses.

Referring now to FIG. 14 which shows the address assignment when the sub-code synchronization signal is written into the flag RAM, an exemplary address assignment in the flag RAM is shown in this configuration. Assuming in this configuration that there are four to six frames of delay from a write to a read of sub-code synchronization signal SC in an initial state, the flag RAM can be used for storing sub-code synchronization signal SC. FIG. 14 shows two cases where there are four frames and six frames of delay, respectively, from a write to a read of sub-code synchronization signal SC in the initial state.

As described above, the optical disk playback apparatus of the fifth embodiment utilizes an empty area in the flag RAM, sets a sub-code synchronization signal storage area having 14 addresses in flag RAM 16, while the sub-code processing system remains as before, writes 1-bit sub-code synchronization signal SC into one bit in this area, and only uses the read sub-code synchronization signal. Thus, the optical disk playback apparatus of the fifth embodiment can exactly buffer main data with a smaller increase in the amount of hardware from the conventional configuration and without functional disadvantages. In addition, even a change in synchronization position only involves a change in addressing with few changes in circuit scale, and therefore a low possibility of including systematic errors. Q-code data is free from buffering delay as before.

While a preferred embodiment of the present invention has been described using specific terms, such description is for illustrative purposes only, and it is to be understood that changes and variations may be made without departing from the spirit or scope of the following claims.

What is claimed is:

1. An optical disk playback apparatus for playing back main data and associated sub-code data from an optical recording medium, said apparatus comprising:
    an interleave RAM configured to store said main data; and
    a controller configured to write a sub-code synchronization signal generated by performing a predefined synchronization protection on synchronization information that is included in said sub-code data,
    wherein said sub-code synchronization signal is written into an empty area of said interleave RAM to manage sub-code data addressed to a FIFO area in a manner similar to said main data, causing said sub-code data to function in synchronization with said main data.

2. The apparatus according to claim 1, further comprising:
    a buffer memory for external output,
    wherein said sub-code synchronization signal controls a start of a write into said buffer memory when said main data read from said interleave RAM is stored in said buffer memory as decoded data.

3. The apparatus according to claim 1, wherein said empty area for storing sub-code synchronization signal is a memory area adjacent to a position at which a data symbol allocated an interleave delay is placed out of a group of data symbols in each frame into which said main data is written.

4. The apparatus according to claim 3, wherein said empty area for storing said sub-code synchronization signal has a memory size with margin addresses equivalent to a data symbol which is allocated a minimum or a maximum interleave delay.

5. The apparatus according to claim 1, wherein said controller writes said sub-code synchronization signal into said interleave RAM once per frame.

6. The apparatus according to claim 1, wherein said interleave RAM includes an area in said empty area for storing said sub-code synchronization signal, said area including a margin address area for controlling a delay due to a FIFO operation.

7. The apparatus according to claim 1, wherein said sub-code synchronization signal stored in said empty area of said interleave RAM comprises one bit.

8. The apparatus according to claim 1, further comprising a circuit configured to store, in said empty area of said interleave RAM, symbol data in which a sub-code symbol bit P is replaced with bit data which is said sub-code synchronization signal, and separate a sub-code synchronization signal, a Q-bit, an R-bit, an S-bit, a T-bit, a U-bit, a V-bit and a W-bit from said symbol data retrieved through de-interleaving.

9. The apparatus according to claim 1, wherein minimum configuration for storing said sub-code synchronization signal includes three storage areas including a storage area for margin addresses, a storage area for storing a data write address, and a storage area for storing a data read address.

10. An optical disk playback apparatus for playing back main data and an associated sub-code read from an optical recording medium, said apparatus comprising:
    an interleave RAM configured to store said main data; and
    a controller configured to write a sub-code synchronization signal generated by performing a predefined synchronization protection on synchronization information included in said sub-code into an empty area of said interleave RAM to manage addresses with a FIFO area in a manner similar to said main data, and cause said sub-code synchronization signal read from said interleave RAM to function as a sub-code synchronization signal synchronized with said main data,
    wherein said controller writes, when said FIFO area included in said interleave RAM is centered in response to an underflow of said FIFO area, "0" data into addresses of a sub-code synchronization signal storage area jumped by said centering.

11. The apparatus according to claim 10, wherein in management of addresses with said FIFO area of said interleave RAM, a read address is centered with reference to a write address when said managed FIFO area overflows or underflows.

12. An optical disk playback apparatus for playing back main data and an associated sub-code read from an optical recording medium, said apparatus comprising:
    an interleave RAM configured to store said main data;
    a controller configured to write a sub-code synchronization signal generated by performing a predefined synchronization protection on synchronization information included in said sub-code into an empty area of said interleave RAM to manage the address with a FIFO area in a manner similar to said main data, and cause said sub-code synchronization signal read from said interleave RAM to function as a sub-code synchronization signal synchronized with said main data; and
    a synchronization signal masking circuit configured to mask said sub-code synchronization signal read from said interleave RAM for a certain period from an underflow of said FIFO area to a read of addresses of a sub-code synchronization signal storage area jumped by centering of said FIFO area.

13. The apparatus according to claim 12, wherein in management of addresses with said FIFO area of said interleave RAM, a read address is centered with reference to a write address when said managed FIFO area overflows or underflows.

14. An optical disk playback apparatus for playing back main data and an associated sub-code read from an optical recording medium, said apparatus comprising:
    an interleave RAM configured to store said main data; and
    a double synchronization protecting circuit configured to store said main data in said interleave RAM, and write a 1-bit sub-code synchronization signal generated by performing a predefined first synchronization protection on synchronization information included in said sub-code into an empty area of said interleave RAM, and perform a second synchronization protection different from said first synchronization protection on said sub-code synchronization signal read from said interleave RAM together with said main data.

15. The apparatus according to claim 14, wherein:
    said first synchronization protection regards first and second synchronization information included in said sub-code only as said synchronization information when said first and second synchronization information is continuous in a result of periodically counting said first and second synchronization information; and said second synchronization protection again inserts a sub-code synchronization signal or ignores said sub-code synchronization signal read from said interleave RAM in accordance with said result of the periodic count.

16. An optical disk playback apparatus for playing back main data and an associated sub-code read from an optical recording medium, said apparatus comprising:

a flag RAM configured to store a flag signal associated with said main data; and a controller confgured to write a sub-code synchronization signal generated by performing a predefined synchronization protection on synchronization information included in said sub-code into an empty area of said flag RAM to manage addresses with a FIFO area in a manner similar to said main data, cause said sub-code synchronization signal read from said flag RAM to function in synchronization with said main data.

17. The apparatus according to claim 16, wherein said flag RAM includes a storage area for storing said sub-code synchronization signal, said storage area having a memory capacity in accordance with a margin address capacity of said FIFO area which is previously set in accordance with a capacity of said empty area of said flag RAM.

18. An optical disk playback apparatus comprising:

a PLL circuit configured to generate a bit clock from main data and an associated sub-code data from an optical recording medium which stores said main data and said sub-code data;

a data detecting and demodulating circuit configured to receive said bit clock, said main data and said sub-code data, detect synchronization information, demodulate EFM modulated main data, and deliver said demodulated main data;

a synchronization protecting/error correcting/Q-code separating circuit configured to deliver a Q-code CRC determination signal resulting from a CRC-based error check on a basis of said synchronization information and said demodulated main data, a Q-code data symbol, and a sub-code synchronization signal generated by performing a synchronization protection on said synchronization information;

a Q-code buffer configured to read time/position information from said Q-code data symbol;

an interleave RAM configured to store said main data and said sub-code synchronization signal;

an error correcting/memory control circuit configured to receive symbols including said sub-code synchronization signal and said main data to perform a CIRC error correction thereon, manage addresses of a margin address area in each symbol area stored in said interleave RAM through a FIFO operation, store said symbols including said sub-code synchronization signal in an empty area of said interleave RAM on a frame-by-frame basis, and deliver said sub-code synchronization signal and said main data which are read from said interleave RAM in synchronization;

a flag RAM configured to store a result of said error correction;

a memory controller configured to receive said main data and said sub-code synchronization signal read from said interleave RAM through said error correcting/memory control circuit;

a buffer memory configured to store said main data in synchronization with said sub-code synchronization signal; and a CPU configured to manage said main data in association with said Q-code data symbol, and conduct a control for storing said main data in said buffer memory and an optical position control for said optical recording medium.

19. A data playback method for playing back main data and an associated sub-code read from an optical recording medium in an optical disk playback apparatus, said method comprising:

previously performing a predefined synchronization protection on synchronization information included in said sub-code to generate a sub-code synchronization signal;

writing said sub-code synchronization signal in an empty area of an interleave RAM for storing said main data; and managing addresses with a FIFO area in a manner similar to said main data to cause said sub-code synchronization signal read from said interleave RAM to function in synchronization with said main data.

20. The method according to claim 19, further comprising:

storing said sub-code synchronization signal in one of a plurality of bits in said empty area of said interleave RAM, and storing a CRC error determination result for a symbol bit Q out of eight sub-code symbols P, Q, R, S, T, U, V, Q included in said sub-code in another one of said bits in said empty area.

21. The method according to claim 19, further comprising:

storing symbol data in said empty area of said interleave RAM, said symbol data having a sub-code symbol bit P replaced with bit data which is said sub-code synchronization data; and separating said sub-code synchronization signal and a Q-bit, R-bit, S-bit, T-bit, U-bit, V-bit and W-bit from said symbol data retrieved through de-interleaving.

22. A data playback method for playing back main data and an associated sub-code read from an optical recording medium in an optical disk playback apparatus, said method comprising:

previously performing a predefined synchronization protection on synchronization information included in said sub-code to generate a sub-code synchronization signal;

writing said sub-code synchronization signal into an empty area of a flag RAM for storing a flag signal of said main data; and managing addresses with a FIFO area in a manner similar to said main data to cause said sub-code synchronization signal read from said flag RAM to function in synchronization with said main data.

23. The method according to claim 22, wherein when said flag RAM is used for storing said sub-code synchronization signal, said FIFO area has a margin address area which is previously set to a memory capacity determined in accordance with a capacity of an empty area of said flag RAM.

24. A data playback method for playing back main data and an associated sub-code read from an optical recording medium in an optical disk playback apparatus, said method comprising:

previously performing a predefined synchronization protection on synchronization information included in said sub-code to generate a sub-code synchronization signal;

writing said sub-code synchronization signal in an empty area of an interleave RAM for storing said main data;

managing addresses with a FIFO area in a manner similar to said main data to cause said sub-code synchronization signal read from said interleave RAM to function as a sub-code synchronization signal which synchronized with said main data;

centering said FIFO area included in said interleave RAM in response to an underflow of said FIFO area; and writing "0" data at an address of a sub-code synchronization signal storage area which is jumped by said centering.

25. A data playback method for playing back main data and an associated sub-code read from an optical recording medium in an optical disk playback apparatus, said method comprising:

storing said main data in an interleave RAM;

performing a predefined first synchronization protection on synchronization information included in said sub-code to generate a 1-bit sub-code synchronization signal;

writing said sub-code synchronization signal into an empty area of said interleave RAM;

reading said sub-code synchronization signal from said interleave RAM together with said main data; and performing a second synchronization protection different from said first synchronization protection on said sub-code synchronization signal read from said interleave RAM.

26. The method according to claim 25, further comprising:

periodically counting first and second synchronization information included in said sub-code;

regarding said first and second synchronization information as said sub-code synchronization signal through said first synchronization protection only when said first and second synchronization information are continuous; and inserting again said sub-code synchronization signal or ignoring said sub-code synchronization signal read from said interleave RAM in accordance with a result of said periodic counting, through said second synchronization protection for said first and second synchronization information.

* * * * *

UNITED STATES PATENT AND TRADEMARK OFFICE
CERTIFICATE OF CORRECTION

PATENT NO. : 7,343,544 B2
APPLICATION NO. : 10/626518
DATED : March 11, 2008
INVENTOR(S) : Youichi Koseki It is certified that error appears in the above-identified patent and that said Letters Patent is hereby corrected as shown below:

Col. 1, line 32, delete "100000000001000000000010", insert -- 10000000001000000000010 --

Col. 1, line 38, delete "0100000000000", insert -- 01000000000000 --

Col. 2, line 64, delete "1000000000001000000010", insert -- 10000000001000000000010 --

Col. 16, line 41, delete "n", insert -- $\underline{n}$ --

Col. 23, line 35, after "storing" insert -- said --

Signed and Sealed this

Twenty-eighth Day of October, 2008

JON W. DUDAS
*Director of the United States Patent and Trademark Office*